(12) United States Patent
Su et al.

(10) Patent No.: US 11,452,197 B2
(45) Date of Patent: Sep. 20, 2022

(54) SHOCK WAVE VISUALIZATION FOR EXTREME ULTRAVIOLET PLASMA OPTIMIZATION

(71) Applicant: TAIWAN SEMICONDUCTOR MANUFACTURING CO., LTD., Hsinchu (TW)

(72) Inventors: Yen-Shuo Su, Hsinchu (TW); Jen-Hao Yeh, Hsinchu (TW); Jhan-Hong Yeh, Hsinchu (TW); Ting-Ya Cheng, Hsinchu (TW); Yee-Shian Henry Tong, Hsinchu (TW); Chun-Lin Chang, Zhubei (TW); Han-Lung Chang, Kaohsiung (TW); Li-Jui Chen, Hsinchu (TW); Po-Chung Cheng, Chiayi County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 322 days.

(21) Appl. No.: 16/655,116

(22) Filed: Oct. 16, 2019

(65) Prior Publication Data

US 2020/0137864 A1    Apr. 30, 2020

Related U.S. Application Data

(60) Provisional application No. 62/752,289, filed on Oct. 29, 2018.

(51) Int. Cl.
*H05G 2/00* (2006.01)
*G01V 8/12* (2006.01)

(52) U.S. Cl.
CPC ............... *H05G 2/008* (2013.01); *G01V 8/12* (2013.01)

(58) Field of Classification Search
CPC ........... H05G 2/008; H05G 2/005; G01V 8/12
See application file for complete search history.

(56) References Cited

U.S. PATENT DOCUMENTS

| | | | |
|---|---|---|---|
| 8,455,850 B2 * | 6/2013 | Endo | H05G 2/003 250/504 R |
| 8,796,666 B1 | 8/2014 | Huang et al. | |
| 9,093,530 B2 | 7/2015 | Huang et al. | |
| 9,110,022 B2 * | 8/2015 | Clough | G01N 21/3504 |
| 9,184,054 B1 | 11/2015 | Huang et al. | |

(Continued)

FOREIGN PATENT DOCUMENTS

WO    WO-2020086901 A1 *    4/2020    ............. H05G 2/005

OTHER PUBLICATIONS

Tschurlovits, Manfred. "What is"ionizing radiation"?." (1997) (Year: 1997).*

(Continued)

*Primary Examiner* — Wyatt A Stoffa
(74) *Attorney, Agent, or Firm* — McDermott Will & Emery LLP

(57) ABSTRACT

A method for monitoring a shock wave in an extreme ultraviolet light source includes irradiating a target droplet in the extreme ultraviolet light source apparatus of an extreme ultraviolet lithography tool with ionizing radiation to generate a plasma and to detect a shock wave generated by the plasma. One or more operating parameters of the extreme ultraviolet light source is adjusted based on the detected shock wave.

20 Claims, 13 Drawing Sheets

(56) References Cited

U.S. PATENT DOCUMENTS

| | | |
|---|---|---|
| 9,256,123 B2 | 2/2016 | Shih et al. |
| 9,529,268 B2 | 12/2016 | Chang et al. |
| 9,548,303 B2 | 1/2017 | Lee et al. |
| 9,618,837 B2 | 4/2017 | Lu et al. |
| 9,869,928 B2 | 1/2018 | Huang et al. |
| 9,869,934 B2 | 1/2018 | Huang et al. |
| 9,869,939 B2 | 1/2018 | Yu et al. |
| 2013/0153790 A1* | 6/2013 | Clough .............. G01N 21/3504 250/473.1 |
| 2015/0083936 A1* | 3/2015 | Wehrens ................ H05G 2/008 250/504 R |
| 2019/0150260 A1* | 5/2019 | Yanagida ............... H05G 2/006 250/504 R |

OTHER PUBLICATIONS

A. Mazumdar, "Principles and Techniques of Schlieren Imaging Systems," Columbia University Computer Science Technical Reports (2013).

* cited by examiner

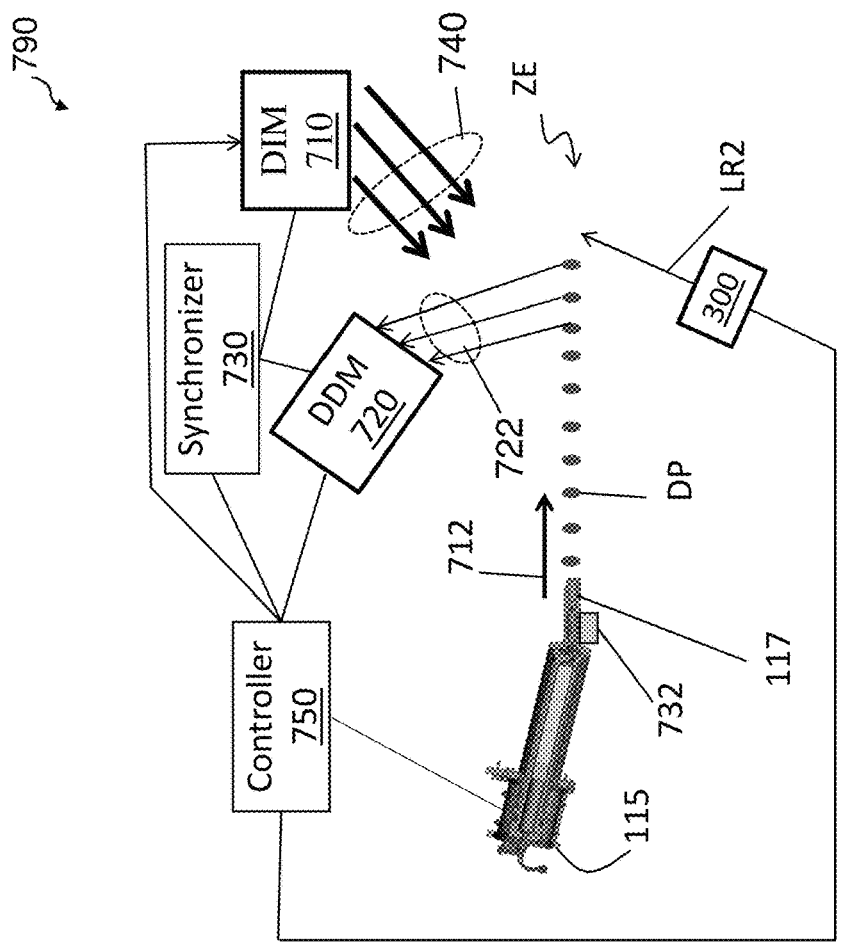
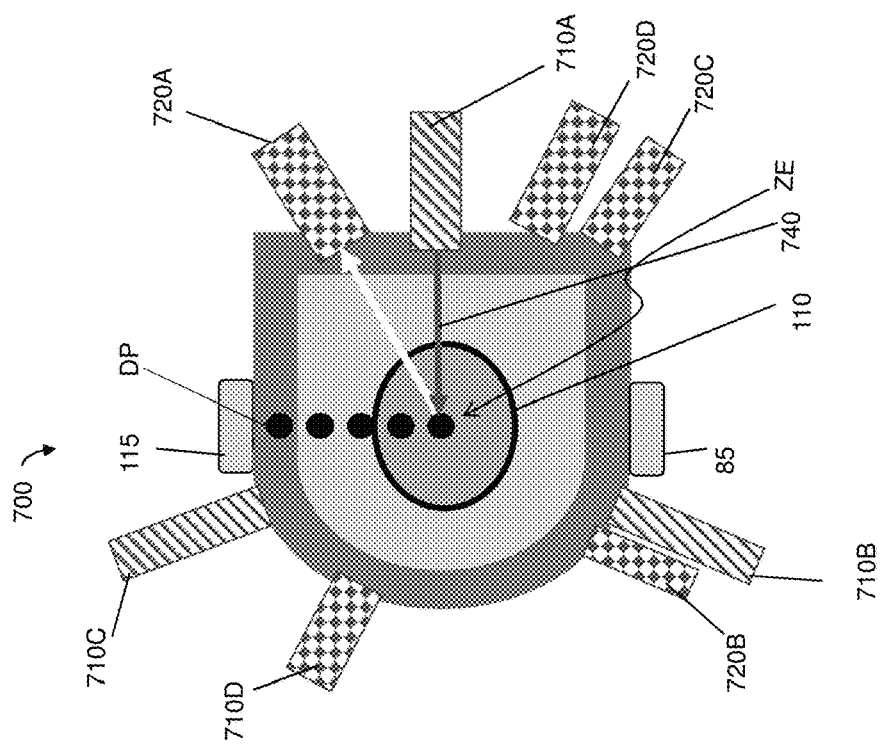
FIG. 7B
FIG. 7A

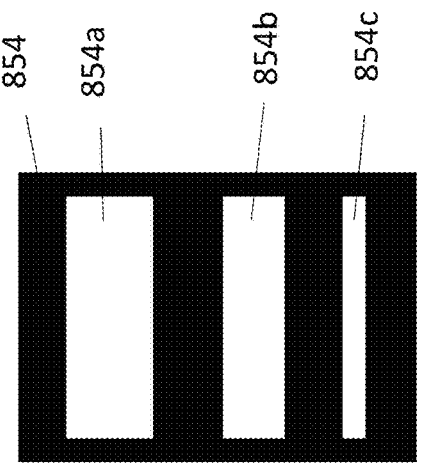
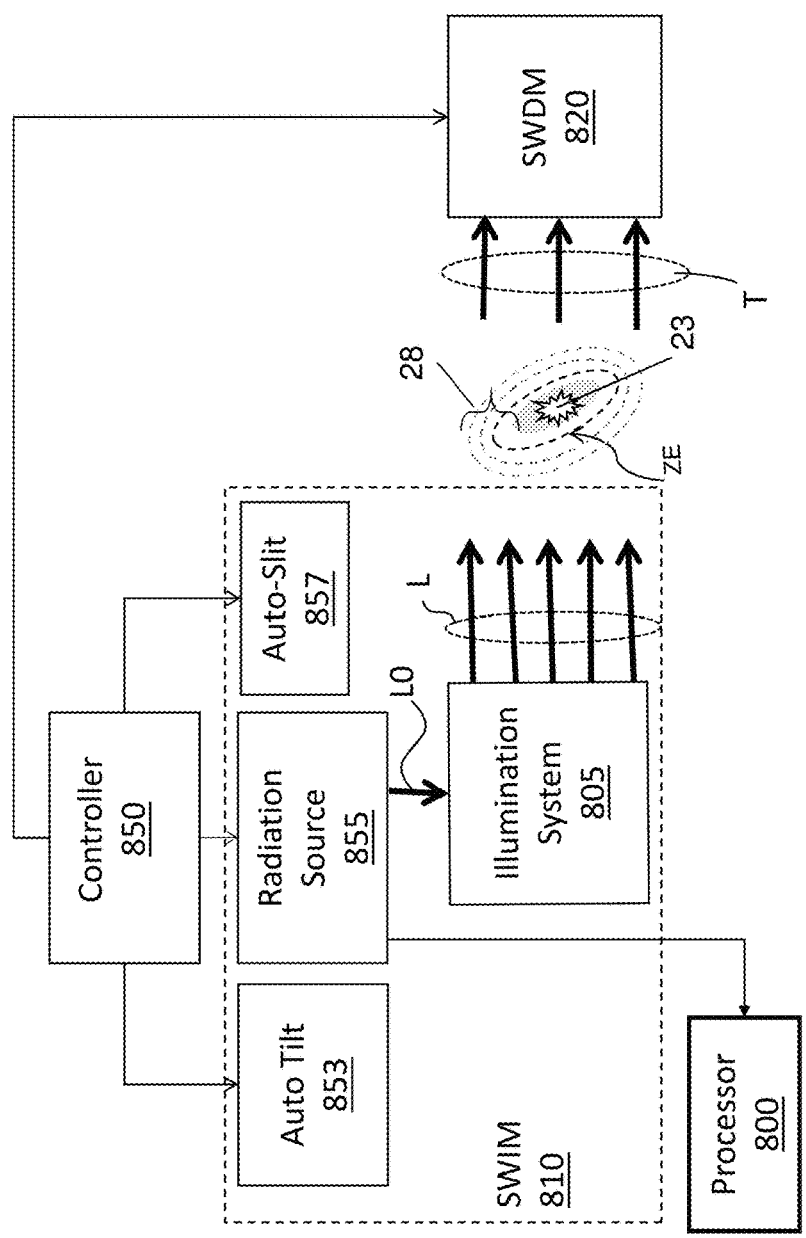
FIG. 8B
FIG. 8A

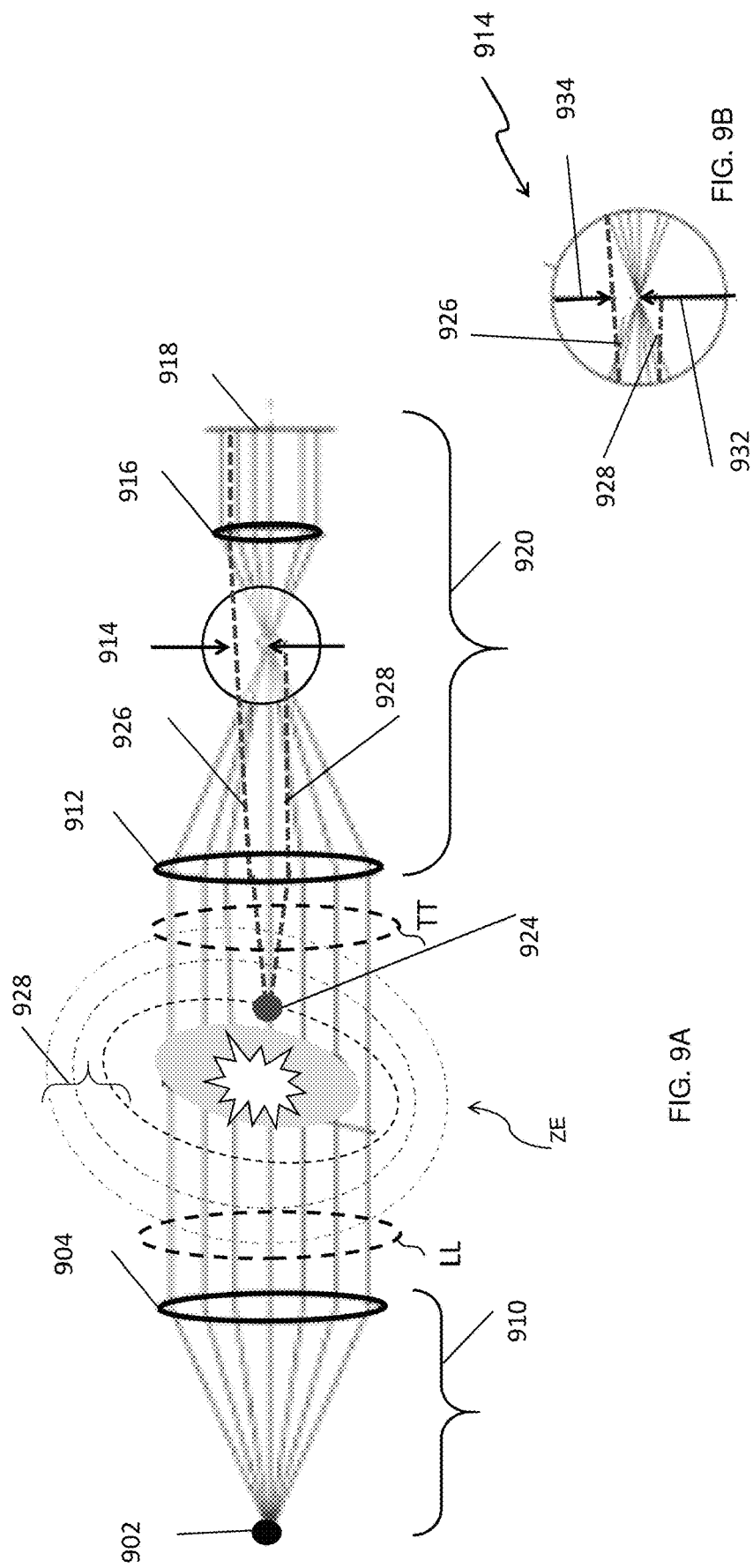

SHOCK WAVE VISUALIZATION FOR EXTREME ULTRAVIOLET PLASMA OPTIMIZATION

PRIORITY CLAIM AND CROSS-REFERENCE

This application claims priority to U.S. Provisional Application No. 62/752,289 filed on Oct. 29, 2018, entitled "Shock Wave Visualization for Extreme Ultraviolet Plasma Optimization," the entire disclosure of which is incorporated herein by reference.

BACKGROUND

The wavelength of radiation used for lithography in semiconductor manufacturing has decreased from ultraviolet to deep ultraviolet (DUV) and, more recently to extreme ultraviolet (EUV). Further decreases in component size require further improvements in resolution of lithography which are achievable using extreme ultraviolet lithography (EUVL). EUVL employs radiation having a wavelength of about 1-100 nm. One method for producing EUV radiation is laser-produced plasma (LPP). In an LPP-based EUV source, a high-power laser beam is focused on small droplet targets of metal, such as tin, to form a highly ionized plasma that emits EUV radiation with a peak maximum emission at 13.5 nm.

The intensity of the EUV radiation produced by LPP depends on the effectiveness with which the high-powered laser can produce the plasma from the droplet targets. Precise synchronization of the pulses of the high-powered laser with generation and movement of the droplet targets is desired to improve the efficiency of an LPP-based EUV radiation source. The laser-produced plasma may generate a shock wave in the LPP-based EUV source and the momentum carried by the shock wave may be transferred to the next droplet and cause droplet position deviation such that the next laser pulse may not efficiently hit the next droplet or may even miss the next droplet. A monitoring system to determine when a shock wave is generated and the extent of the shock wave and a control method to minimize the effect of the shock wave is desirable.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 7A shows devices for illuminating and imaging tin droplets and shock waves in an EUV radiation source in accordance with some embodiments of the present disclosure.

FIG. 7B shows devices for illuminating and imaging tin droplets in an EUV radiation source in accordance with some embodiments of the present disclosure.

FIG. 8A shows devices for illuminating and imaging the shock waves in the EUV radiation source in accordance with some embodiments of the present disclosure.

FIG. 8B is a detailed view of the slit control mechanism used in the apparatus of FIG. 8A in accordance with an embodiment of the present disclosure.

FIG. 9A shows an optical system for illuminating and imaging the shock waves in the EUV radiation source in accordance with some embodiments of the present disclosure.

FIG. 9B shows an aperture of the optical system for imaging the shock waves in the EUV radiation source in accordance with some embodiments of the present disclosure.

DETAILED DESCRIPTION

Figure 1:
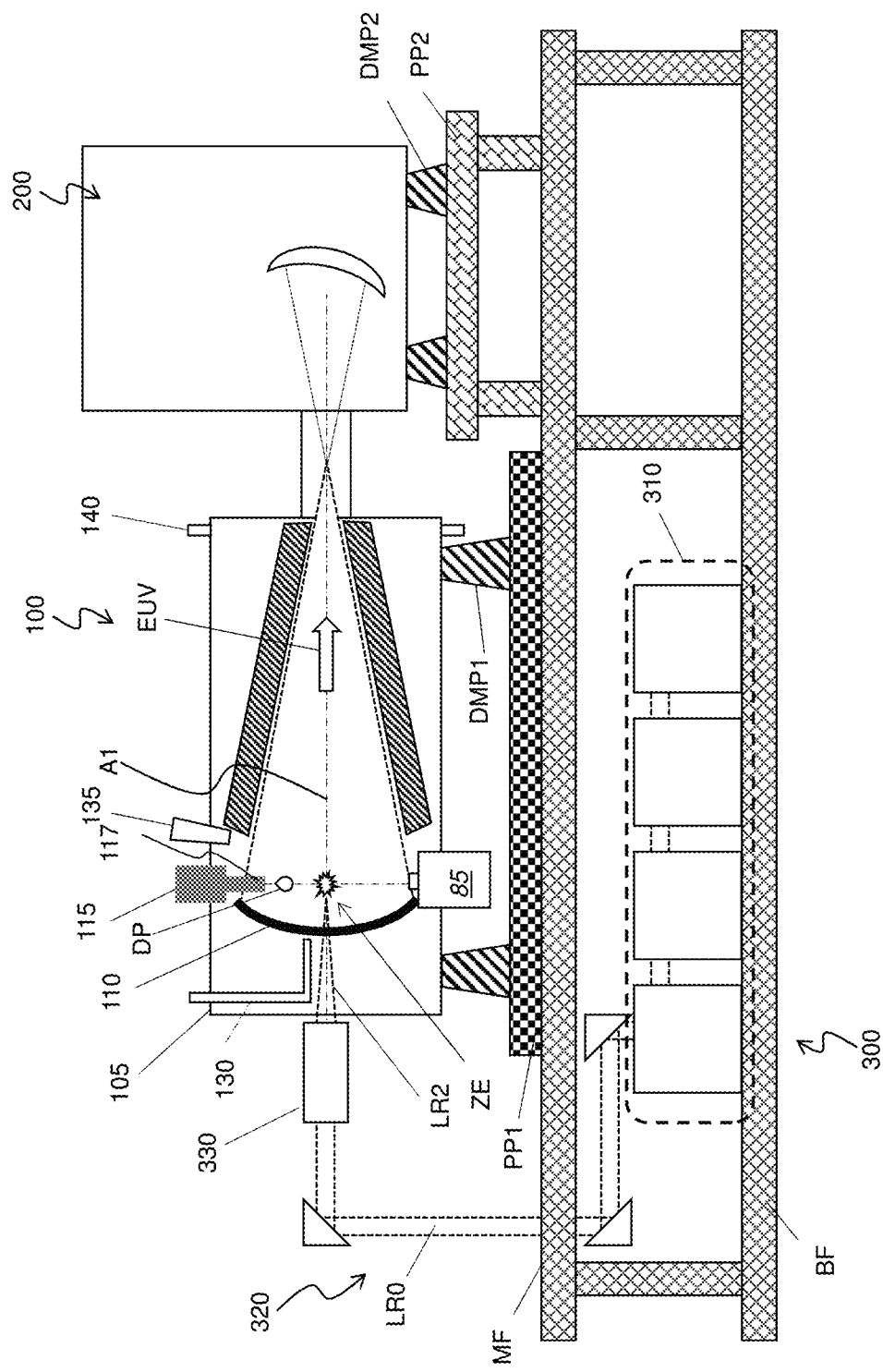
FIG. 1 shows a schematic view of an EUV lithography system with a laser produced plasma (LPP) EUV radiation source in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "being made of" may mean either "comprising" or "consisting of." In the present disclosure, a phrase "one of A, B and C" means "A, B and/or C" (A, B, C, A and B, A and C, B and C, or A, B and C), and does not mean one element from A, one element from B and one element from C, unless otherwise described.

The present disclosure is generally related to extreme ultraviolet lithography (EUVL) systems and methods. More particularly, it is related to apparatuses and methods for monitoring the metal droplets, e.g., tin droplets, that are travelling from a droplet generator to a zone of excitation where at the zone of excitation a excitation laser hits the droplets, interacts with (heats) the tin droplet in the LPP chamber to ionize the droplets to a plasma which emits the EUV radiation. In some embodiments, the interaction of the excitation laser with the tin droplet creates a shock wave. In some embodiments, the shock wave expands and impacts the next tin droplet that is generated by the droplet generation such that the direction of travel and/or speed of the next droplet changes such that the next droplet does not pass through the zone of excitation at the time that the excitation laser is fired.

A droplet illumination module (DIM) is used to illuminate the inside of the EUV radiation source and a droplet detection module (DDM) is used to measure the parameters corresponding to the tin droplets. The DIM directs non-ionizing light, e.g., a laser light, to the target droplet and the reflected and/or scattered light is detected by the DDM. The light from the DIM is "non-ionizing" and the light from the DIM is used to illuminate the metal droplets inside the EUVL system such that a detector such as a camera can take an image of the tin droplets. The embodiments of the present disclosure are directed to controlling droplet illumination and detection for accurately measuring the parameters related to the metal droplets that include direction of travel and speed of the droplets inside the EUVL system.

As noted, the interaction of the excitation laser with the tin droplet may create a shock wave. A shock wave illumination module (SWIM) is used to illuminate the zone of excitation inside of the EUV radiation source and a shock wave detection module (SWDM) is used to image the zone of excitation and to determine if a shock wave is generated and if the shock wave may impact the direction of travel of the droplets. In some embodiments, if it is determined that a shock wave is generated and it is determined that the shock wave impacts the direction of travel and/or speed of the next droplet, a controller commands the droplet generator to delay the generation of the next droplet until the shock wave clears a path of the next droplet. Also, the controller commands the laser generator to delay the next pulse of the excitation laser.

FIG. 1 shows a schematic view of an EUV lithography system with a laser produced plasma (LPP) EUV radiation source in accordance with some embodiments of the present disclosure. The EUV lithography system includes an EUV radiation source 100 (an EUV light source) to generate EUV radiation, an exposure device 200, such as a scanner, and an excitation laser source 300. As shown in FIG. 1, in some embodiments, the EUV radiation source 100 and the exposure device 200 are installed on a main floor MF of a clean room, while the excitation laser source 300 is installed in a base floor BF located under the main floor. Each of the EUV radiation source 100 and the exposure device 200 are placed over pedestal plates PP1 and PP2 via dampers DMP1 and DMP2, respectively. The EUV radiation source 100 and the exposure device 200 are coupled to each other by a coupling mechanism, which may include a focusing unit.

The lithography system is an EUV lithography system designed to expose a resist layer by EUV light (also interchangeably referred to herein as EUV radiation). The resist layer is a material sensitive to the EUV light. The EUV lithography system employs the EUV radiation source 100 to generate EUV light, such as EUV light having a wavelength ranging between about 1 nm and about 100 nm. In one particular example, the EUV radiation source 100 generates an EUV light with a wavelength centered at about 13.5 nm. In the present embodiment, the EUV radiation source 100 utilizes a mechanism of laser-produced plasma (LPP) to generate the EUV radiation.

The exposure device 200 includes various reflective optical components, such as convex/concave/flat mirrors, a mask holding mechanism including a mask stage, and wafer holding mechanism. The EUV radiation generated by the EUV radiation source 100 is guided by the reflective optical components onto a mask secured on the mask stage. In some embodiments, the mask stage includes an electrostatic chuck (e-chuck) to secure the mask. Because gas molecules absorb EUV light, the lithography system for the EUV lithography patterning is maintained in a vacuum or a-low pressure environment to avoid EUV intensity loss. The exposure device 200 is described in more details with respect to FIG. 2.

In the present disclosure, the terms mask, photomask, and reticle are used interchangeably. In some embodiments, the mask is a reflective mask. In some embodiments, the mask includes a substrate with a suitable material, such as a low thermal expansion material or fused quartz. In various examples, the material includes $TiO_2$ doped $SiO_2$, or other suitable materials with low thermal expansion. The mask includes multiple reflective layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The mask may further include a capping layer, such as ruthenium (Ru), disposed on the ML for protection. The mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

The exposure device 200 includes a projection optics module for imaging the pattern of the mask on to a semiconductor substrate with a resist coated thereon secured on a substrate stage of the exposure device 200. The projection optics module generally includes reflective optics. The EUV radiation (EUV light) directed from the mask, carrying the image of the pattern defined on the mask, is collected by the projection optics module, thereby forming an image on the resist.

In various embodiments of the present disclosure, the semiconductor substrate is a semiconductor wafer, such as a silicon wafer or other type of wafer to be patterned. The semiconductor substrate is coated with a resist layer sensitive to the EUV light in presently disclosed embodiments. Various components including those described above are integrated together and are operable to perform lithography exposing processes. The lithography system may further include other modules or be integrated with (or be coupled with) other modules.

As shown in FIG. 1, the EUV radiation source 100 includes a droplet generator 115 and a LPP collector mirror 110, enclosed by a chamber 105. A droplet DP that does not interact goes to a droplet catcher 85. The droplet generator 115 generates a plurality of target droplets DP, which are supplied into the chamber 105 through a nozzle 117. In some embodiments, the target droplets DP are tin (Sn), lithium (Li), or an alloy of Sn and Li. In some embodiments, the target droplets DP each have a diameter in a range from about 10 microns (μm) to about 100 μm. For example, in an embodiment, the target droplets DP are tin droplets, each having a diameter of about 10 μm, about 25 μm, about 50 μm, or any diameter between these values. In some embodiments, the target droplets DP are supplied through the nozzle 117 at a rate in a range from about 50 droplets per second (i.e., an ejection-frequency of about 50 Hz) to about 50,000 droplets per second (i.e., an ejection-frequency of about 50 kHz). For example, in an embodiment, target droplets DP are supplied at an ejection-frequency of about 50 Hz, about 100 Hz, about 500 Hz, about 1 kHz, about 10 kHz, about 25 kHz, about 50 kHz, or any ejection-frequency between these frequencies. The target droplets DP are ejected through the nozzle 117 and into a zone of excitation ZE (e.g., a target droplet location) at a speed in a range from about 10 meters per second (m/s) to about 100 m/s in various embodiments. For example, in an embodiment, the target droplets DP have a speed of about 10 m/s, about 25 m/s, about 50 m/s, about 75 m/s, about 100 m/s, or at any speed between these speeds.

The excitation laser beam LR2 generated by the excitation laser source 300 is a pulsed beam. The laser pulses of laser beam LR2 are generated by the excitation laser source 300. The excitation laser source 300 may include a laser generator 310, laser guide optics 320 and a focusing apparatus 330. In some embodiments, the laser generator 310 includes a carbon dioxide ($CO_2$) or a neodymium-doped yttrium aluminum garnet (Nd:YAG) laser source with a wavelength in the infrared region of the electromagnetic spectrum. For example, the laser source 310 has a wavelength of 9.4 μm or 10.6 μm, in an embodiment. The laser light beam LR0 generated by the excitation laser source 300 is guided by the laser guide optics 320 and focused, by the focusing apparatus 330, into the excitation laser beam LR2 that is introduced into the EUV radiation source 100. In some embodiments, in addition to $CO_2$ and Nd:YAG lasers, the laser beam LR2 is generated by a gas laser including an excimer gas discharge laser, helium-neon laser, nitrogen laser, transversely excited atmospheric (TEA) laser, argon ion laser, copper vapor laser, KrF laser or ArF laser; or a solid state laser including Nd:glass laser, ytterbium-doped glasses or ceramics laser, or ruby laser. In some embodiments, a non-ionizing laser beam LR1 is also generated by the excitation laser source 300 and the laser beam LR1 is also focused by the focusing apparatus 330.

In some embodiments, the excitation laser beam LR2 includes a pre-heat laser pulse and a main laser pulse. In such embodiments, the pre-heat laser pulse (interchangeably referred to herein as the "pre-pulse) is used to heat (or pre-heat) a given target droplet to create a low-density target plume with multiple smaller droplets, which is subsequently heated (or reheated) by a pulse from the main laser (main pulse), generating increased emission of EUV light compared to when the pre-heat laser pulse is not used.

In various embodiments, the pre-heat laser pulses have a spot size about 100 μm or less, and the main laser pulses have a spot size in a range of about 150 μm to about 300 μm. In some embodiments, the pre-heat laser and the main laser pulses have a pulse-duration in the range from about 10 ns to about 50 ns, and a pulse-frequency in the range from about 1 kHz to about 100 kHz. In various embodiments, the pre-heat laser and the main laser have an average power in the range from about 1 kilowatt (kW) to about 50 kW. The pulse-frequency of the excitation laser beam LR2 is matched with the ejection-frequency of the target droplets DP in an embodiment.

The laser beam LR2 is directed through windows (or lenses) into the zone of excitation ZE. The windows adopt a suitable material substantially transparent to the laser beams. The generation of the laser pulses is synchronized with the ejection of the target droplets DP through the nozzle 117. As the target droplets move through the excitation zone, the pre-pulses heat the target droplets and transform them into low-density target plumes. A delay between the pre-pulse and the main pulse is controlled to allow the target plume to form and to expand to an optimal size and geometry. In various embodiments, the pre-pulse and the main pulse have the same pulse-duration and peak power. When the main pulse heats the target plume, a high-temperature plasma is generated. The plasma emits EUV radiation, which is collected by the collector mirror 110. The collector mirror 110, an EUV collector mirror, further reflects and focuses the EUV radiation for the lithography exposing processes performed through the exposure device 200.

One method of synchronizing the generation of a pulse (either or both of the pre-pulse and the main pulse) from the excitation laser with the arrival of the target droplet in the zone of excitation is to detect the passage of a target droplet at given position and use it as a signal for triggering an excitation pulse (or pre-pulse). In this method, if, for example, the time of passage of the target droplet is denoted by $t_o$, the time at which EUV radiation is generated (and detected) is denoted by trail, and the distance between the position at which the passage of the target droplet is detected and a center of the zone of excitation is d, the speed of the target droplet, $v_{dp}$, is calculated as $$v_{dp}=d/(t_{rad}-t_o) \quad \text{Equation (1).}$$

Because the droplet generator 115 is expected to reproducibly supply droplets at a fixed speed, once $v_{dp}$ is calculated, the excitation pulse is triggered with a time delay of $d/v_{dp}$ after a target droplet is detected to have passed the given position to ensure that the excitation pulse arrives at the same time as the target droplet reaches the center of the zone of excitation. In some embodiments, because the passage of the target droplet is used to trigger the pre-pulse, the main pulse is triggered following a fixed delay after the pre-pulse. In some embodiments, the value of target droplet speed $v_{dp}$ is periodically recalculated by periodically measuring trail, if needed, and the generation of pulses with the arrival of the target droplets is resynchronized.

In an EUV radiation source 100, the plasma caused by the laser application creates debris, such as ions, gases and atoms of the droplet, as well as the desired EUV radiation. It is necessary to prevent the accumulation of material, e.g., debris, on the collector mirror 110 and also to prevent debris exiting the chamber 105 and entering the exposure device 200.

As shown in FIG. 1, a buffer gas is supplied from a first buffer gas supply 130 through the aperture in collector mirror 110 by which the pulse laser is delivered to the tin droplets. In some embodiments, the buffer gas is $H_2$, He, Ar, N or another inert gas. In certain embodiments, $H_2$ is used as H radicals that are generated by ionization of the buffer gas and can be used for cleaning purposes. The buffer gas can also be provided through one or more second buffer gas supplies 135 toward the collector mirror 110 and/or around the edges of the collector mirror 110. Further, the chamber 105 includes one or more gas outlets 140 so that the buffer gas is exhausted outside the chamber 105. Hydrogen gas has low absorption to the EUV radiation. Hydrogen gas reaching to the coating surface of the collector mirror 110 reacts chemically with a metal of the droplet forming a hydride, e.g., metal hydride. When tin (Sn) is used as the droplet, stannane ($SnH_4$), which is a gaseous byproduct of the EUV generation process, is formed. The gaseous $SnH_4$ is then pumped out through the gas outlet 140. However, it is difficult to exhaust all gaseous $SnH_4$ from the chamber and to prevent the $SnH_4$ from entering the exposure device 200. Therefore, monitoring and/or control of the debris in the EUV radiation source 100 is beneficial to the performance of the EUVL system.

Figure 2:
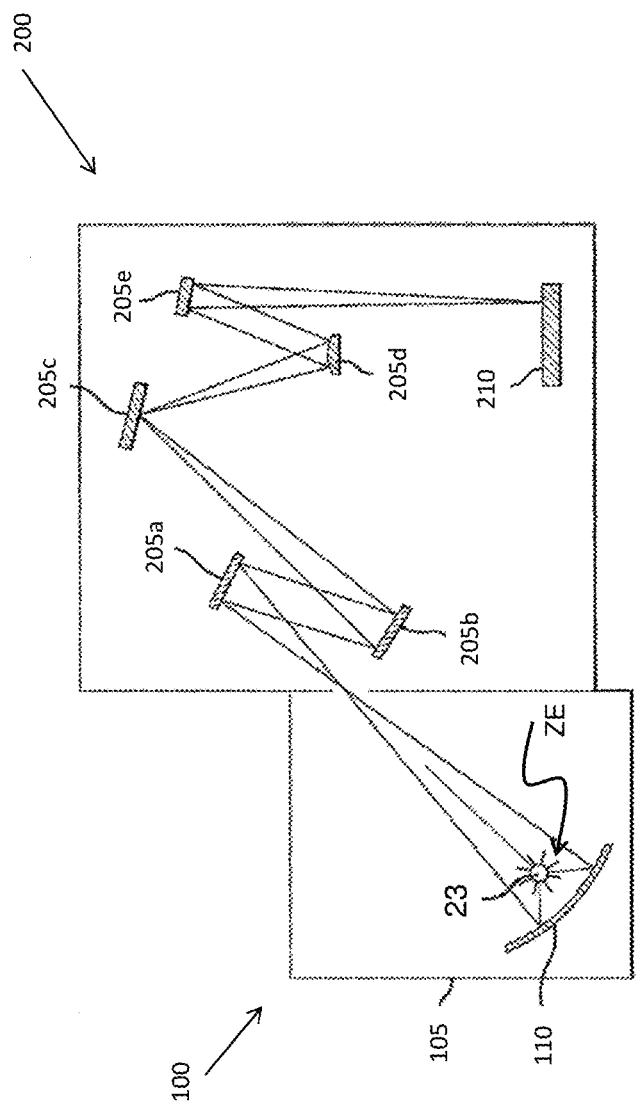
FIG. 2 shows a schematic view of an EUV lithography exposure tool in accordance with some embodiments of the present disclosure.

FIG. 2 shows a schematic view of an EUV lithography exposure tool in accordance with some embodiments of the present disclosure. The EUVL exposure tool of FIG. 2 includes the exposure device 200 that shows the exposure of photoresist coated substrate, a target semiconductor substrate 210, with a patterned beam of EUV light. The exposure device 200 is an integrated circuit lithography tool such as a stepper, scanner, step and scan system, direct write system, device using a contact and/or proximity mask, etc., provided with one or more optics 205a, 205b, for example, to illuminate a patterning optic, such as a reticle, e.g., a reflective mask 205c, with a beam of EUV light, to produce a patterned beam, and one or more reduction projection optics 205d, 205e, for projecting the patterned beam onto the target semiconductor substrate 210. A mechanical assembly (not shown) may be provided for generating a controlled relative movement between the target semiconductor substrate 210 and patterning optic, e.g., a reflective mask 205c. As further shown, the EUVL exposure tool of FIG. 2, further includes the EUV radiation source 100 including a plasma plume 23 at the zone of excitation ZE emitting EUV light in the chamber 105 that is collected and reflected by a collector mirror 110 into the exposure device 200 to irradiate the target semiconductor substrate 210.

Figure 3:
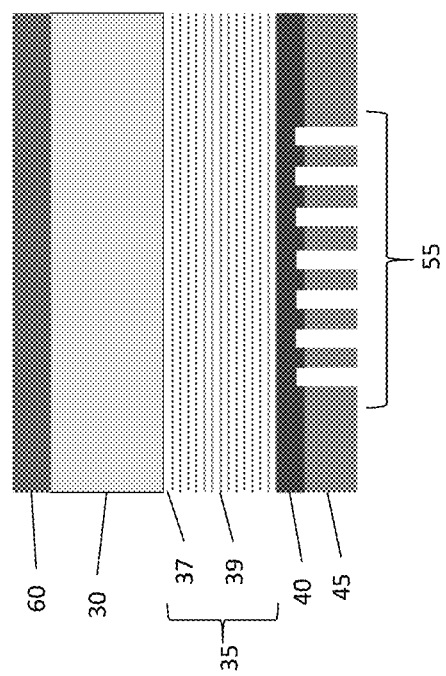
FIG. 3 shows a cross-sectional view of a reflective mask in accordance with some embodiments of the present disclosure.

FIG. 3 shows a cross-sectional view of a reflective mask in accordance with some embodiments of the present disclosure. The terms mask, photomask, and reticle may be used interchangeably. In some embodiments, the mask is a reflective mask as shown by mask 205c in FIG. 2. The reflective mask 205c of FIG. 2 is shown in FIG. 3 and includes a substrate 30, multiple reflective multiple layers (ML) 35 that are deposited on the substrate 30, a conductive backside coating 60, a capping layer 40, and an absorption layer 45. In some embodiments, the material of the substrate 30 includes $TiO_2$ doped $SiO_2$, or other suitable materials with low thermal expansion. In some embodiments, the ML 35 includes a plurality of film pairs, such as molybdenum-silicon (Mo/Si) film pairs (e.g., a layer of molybdenum 39 above or below a layer of silicon 37 in each film pair). Alternatively, the ML 35 may include molybdenum-beryllium (Mo/Be) film pairs, or other suitable materials that are configured to highly reflect the EUV light. The capping layer 40 may include ruthenium (Ru) and may be disposed on the ML 35 for protection. In some embodiments, the absorption layer 45 that includes a tantalum boron nitride (TaBN) layer is deposited over the ML 35 and the capping layer 40. In some embodiments, the absorption layer 45 is patterned with patterns 55 to define a layer of an integrated circuit (IC). In some embodiments, the reflective mask 205c includes a conductive backside coating 60. In some embodiments, another reflective layer may be deposited over the ML 35 and to be patterned to define a layer of an integrated circuit, thereby forming an EUV phase shift reticle.

Figure 4A:
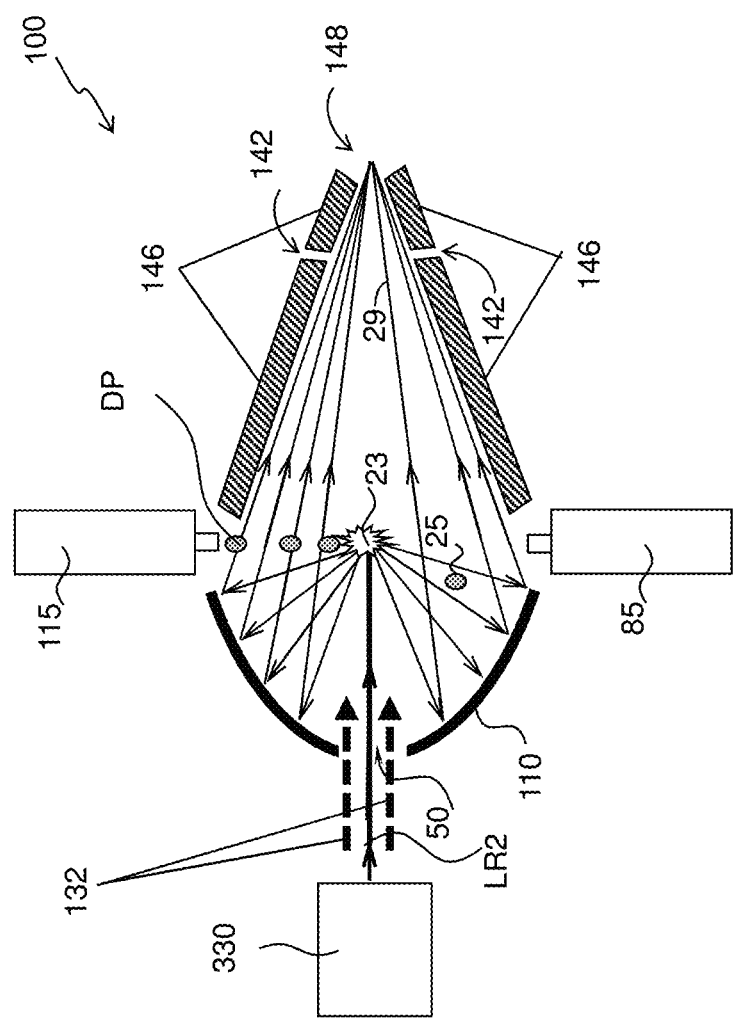
FIGS. 4A and 4B show cross-sectional views of the EUV radiation source in an operation situation in accordance with some embodiments of the present disclosure.
Figure 4B:
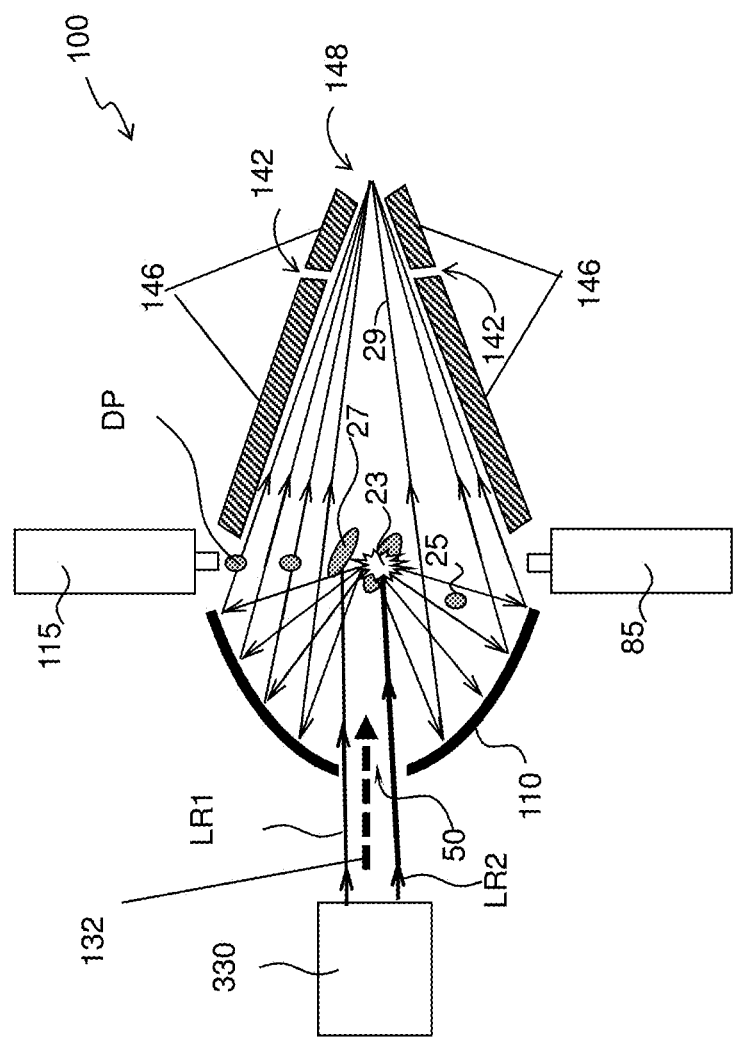

FIGS. 4A and 4B show cross-sectional views of the EUV radiation source in an operation situation in accordance with some embodiments of the present disclosure. In FIG. 4A, the EUV radiation source 100 includes the focusing apparatus 330, the collector mirror 110, the droplet generator 115, an aperture 50, and a drain such as the droplet catcher 85, e.g., a tin catcher, for receiving the unreacted tin droplets, e.g., the debris droplet 25. In some embodiments, the aperture 50 is used for the laser beam LR2 of the focusing apparatus 330 and gas flow 132 to enter into the EUV radiation source 100. The walls 146 are used to create a cone shape such that the EUV radiation along the arrows 29 inside the cone shape exit through the opening 148 and any other radiation that is not along the arrows 29 do not exit the cone shape and thus do not exit the EUV radiation source 100. In some embodiments, at least a portion of the gas flow 132 exits through openings 142 in the wall of the cone shape. The gas flow that exits through the openings 142 may flow in the EUV radiation source 100 and exit the EUV radiation source 100 through the gas outlet 140. The collector mirror 110 is made of a multi-layered mirror including Mo/Si, La/B, La/$B_4$C, Ru/$B_4$C, Mo/$B_4$C, $Al_2O_3$/$B_4$C, W/C, Cr/C, and Cr/Sc with a capping layer including $SiO_2$, Ru, $TiO_2$, and $ZrO_2$, in some embodiments. The diameter of the collector mirror 110 can be about 330 mm to about 750 mm depending on the chamber size of the EUV radiation source 100. The cross-sectional shape of the collector mirror 110 can be elliptical or parabolic, in some embodiments.

In some embodiments, the interaction between the laser beam LR2 and a droplet DP that creates the plasma plume 23 that includes active and highly charged particles or ions such as tin (Sn) ions, also creates a shock wave. The shock wave that is described with respect to FIGS. 5A and 5B, may push the next droplets DP away and cause a spatial positional error/tolerance between the tin droplet DP and the focus position of the laser beam LR2 at the zone of excitation ZE. Also, in some embodiments, an error exists in synchronization between the pulse frequency of the laser beam LR2 and the speed of the ejected tin droplet DP such that when the pulsed laser that is directed to the zone of excitation ZE fires, it misses some droplets and the droplets that have not reached or have already passed the zone of excitation ZE, and thus, become debris droplets 25. The debris droplets 25, may deposit on the lower-half portion of the reflective surface of the collector mirror 110. The deposited debris on the collector mirror 110 may deteriorate the reflective property of the collector mirror 110, thereby lowering the power of EUV radiation source 100 for EUV photolithography of the target semiconductor substrate 210 of FIG. 2, and lowering the quality (such as critical dimension CD and line edge roughness LER) of patterns formed on the photo-sensitive coating (not shown) on the target semiconductor substrate 210.

In FIG. 4B, the EUV radiation source 100 includes the same components of the EUV radiation source 100 of FIG. 4A with at least a difference that focusing apparatus 330 focuses two laser beams. The focusing apparatus 330 focuses the laser beam LR2 at the zone of excitation ZE and also focuses a non-ionizing laser beam LR1 at a location slightly before the zone of excitation ZE. Thus, the aperture 50 allows the ionizing laser beam LR2 and the non-ionizing laser beam LR1 to enter the EUV radiation source 100. In some embodiments, the non-ionizing laser beam LR1 preheats the tin droplet DP and creates a pancake-shaped tin 27 from the droplet DP such that the pancake-shaped tin 27 better interacts with the laser beam LR2 at the zone of excitation and a larger plasma plume 23 and a stronger shock wave is created compared the plasma plume 23 and shock wave that is created in FIG. 4A. In some embodiments, the shock wave causes the laser beams LR1 and LR2 to miss the next droplet DP thereby generating debris droplets 25. In some embodiments, the laser beam LR1 focuses on the next droplet DP and creates the pancake-shaped tin 27, however, the shock wave causes the laser beam LR2 to miss the pancake-shaped tin 27 and the missed pancake-shaped tin 27 becomes a debris droplet 25.

Figure 5A:
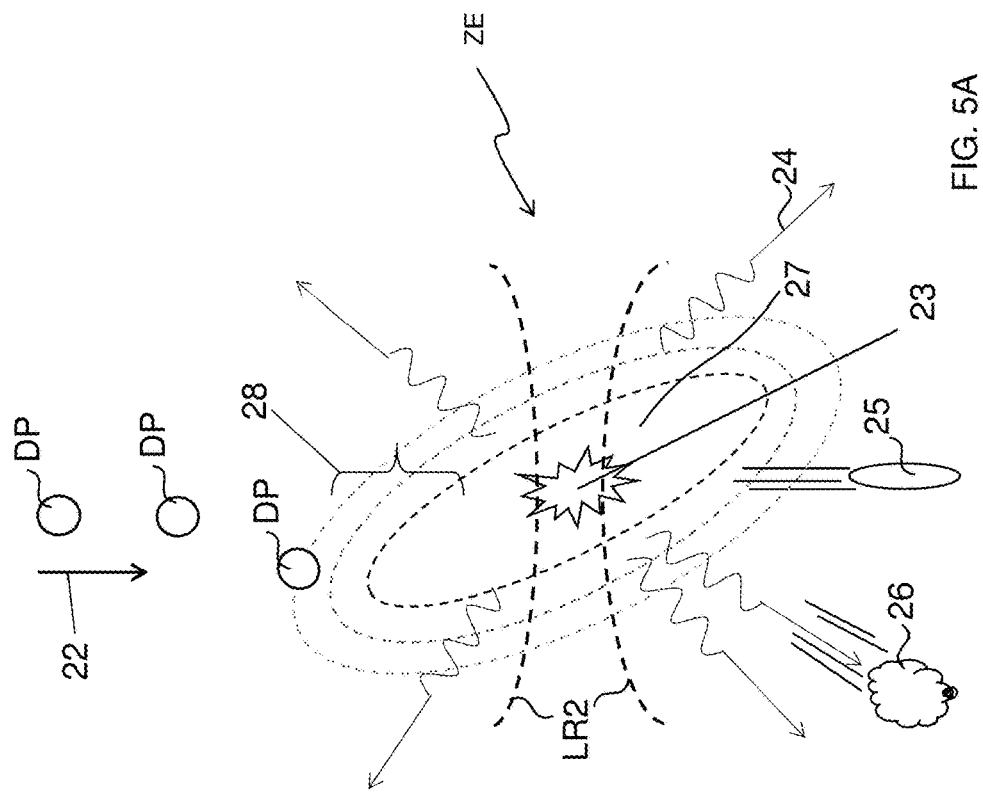
FIGS. 5A and 5B show schematic views of plasma and shock wave formation process through laser-metal interaction between a laser beam and a metal droplet in accordance with some embodiments of the present disclosure.
Figure 5B:
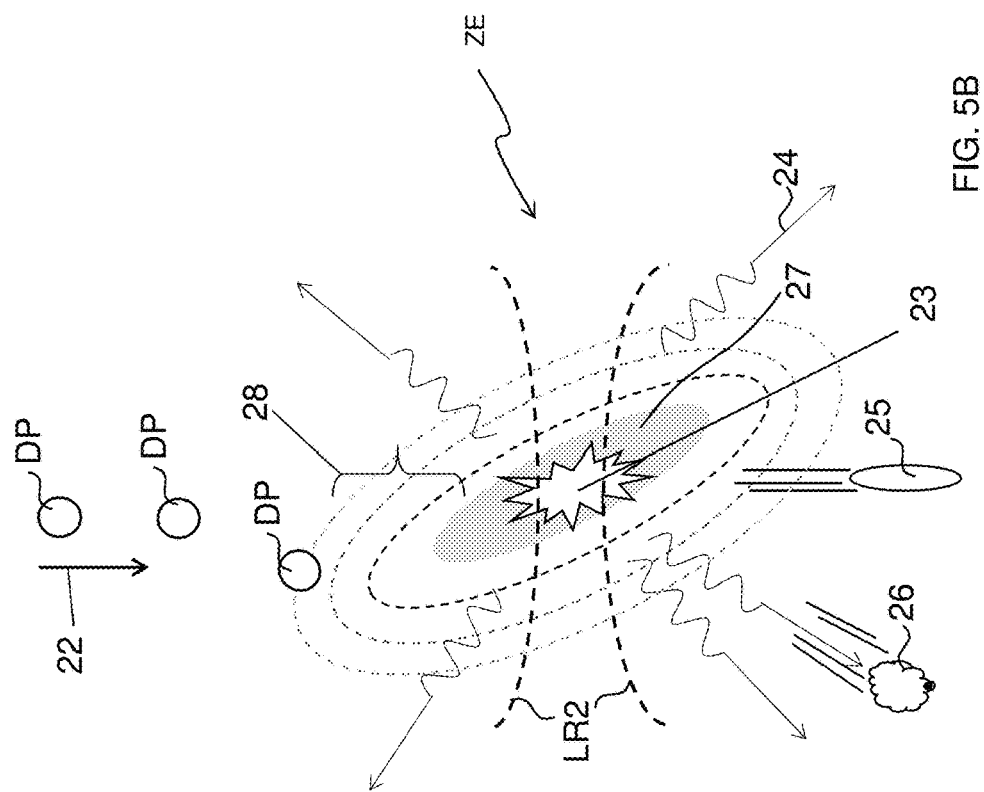

FIGS. 5A and 5B show schematic views of plasma and shock wave formation processes through laser-metal interaction between a laser beam and a metal droplet in accordance with some embodiments of the present disclosure. In FIG. 5A, the ejected metal droplet, e.g., the tin droplet DP, ejected from the droplet generator 115, reaches the zone of excitation ZE where it interacts with the laser beam LR2 to form a plasma plume 23 and a shock wave 28. The zone of excitation ZE is at a focus of the high-power and high-pulse-repetition-rate pulsed laser beam LR2. The laser beam LR2 interacts with the ejected tin droplet DP at the zone of excitation ZE in a space between collector mirror 110 and the walls 146 of EUV radiation source 100 to form the plasma plume 23 which emits EUV light rays 24 in all directions. During this laser-metal interaction, a tin droplet DP could be missed by or not interact sufficiently with the laser beam LR2, thereby passing to a position below the zone of excitation ZE in FIG. 5A, forming debris droplet 25. Also, some tin leftover from the plasma formation process can become debris 26. The debris droplet 25 and debris 26 can accumulate on the surface of the EUV collector mirror, e.g., collector mirror 110 of FIG. 1, deteriorating the reflective quality of the EUV collector mirror 110.

In FIG. 5B, the ejected metal droplet, e.g., the ejected tin droplet DP, after being heated by the pre-heat laser beam LR1 and becoming the pancake-shaped tin 27 reaches the zone of excitation ZE where the pancake-shaped tin 27 interacts with the laser beam LR2 to form the plasma plume 23 and the shock wave 28. The zone of excitation ZE is at a focus of the high-power and high-pulse-repetition-rate pulsed laser beam LR2. The laser beam LR2 interacts with the pancake-shaped tin 27 at the zone of excitation ZE in a space of the chamber of the EUVL system to form the plasma plume 23 which emits EUV light rays 24 in all directions. During this laser-metal interaction, a pancake-shaped tin 27 could be missed by or not interact sufficiently with the laser beam LR2, thereby passing to a position below the zone of excitation ZE in FIG. 5B, forming debris droplet 25. Also, some tin leftover from the plasma formation process can become debris 26. In some embodiments as shown in FIG. 5B, preheating the droplet DP to create the pancake-shaped tin 27 causes a stronger interaction of the laser beam LR2 and thus creates a bigger plasma plume 23, a stronger shock wave 28, and also a smaller debris 26. As shown in FIGS. 5A and 5B the droplets DP travel in a direction 22 from droplet generator 115 to the zone of excitation ZE. In some embodiments, the shock wave 28 creates an impact on the next droplet DP and moves the next droplet DP away from the direction 22 such that the next droplet DP does not pass through the zone of excitation ZE.

Figure 6:
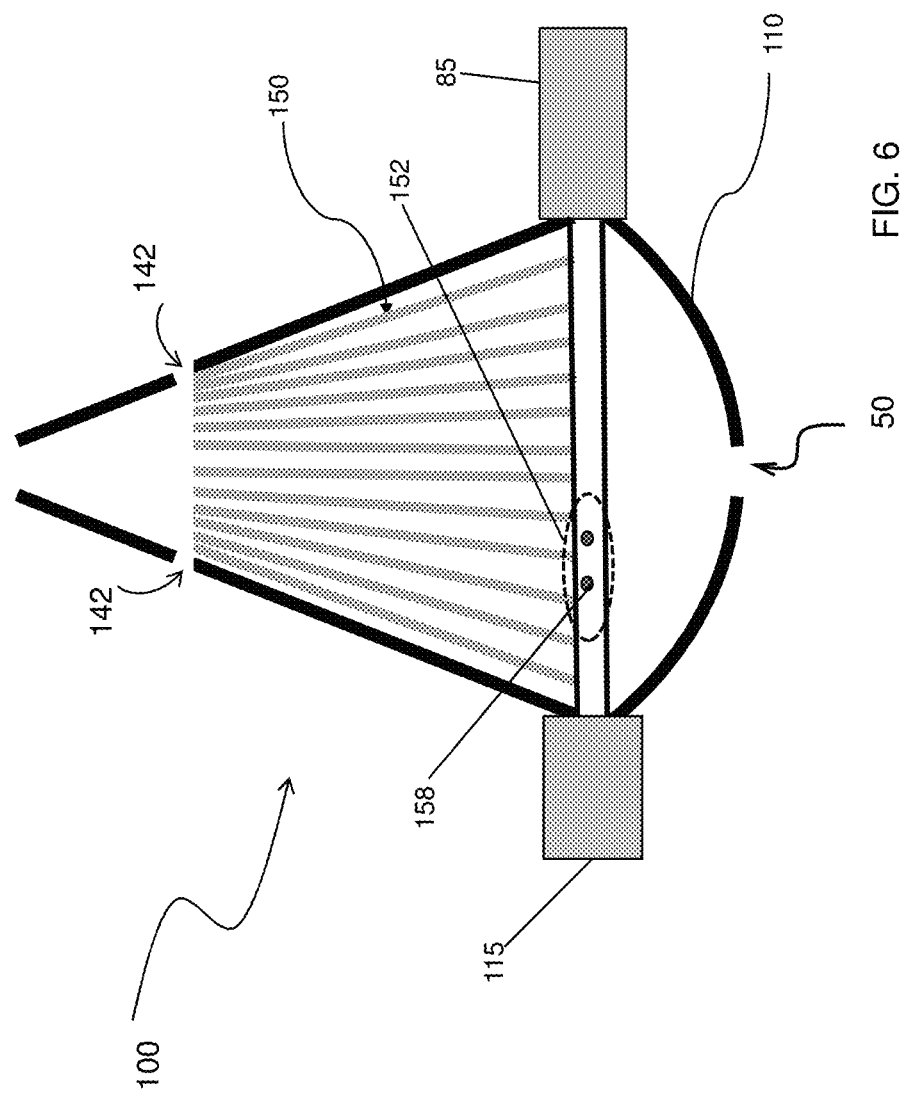
FIG. 6 shows a schematic view of a collector mirror and related portions of an EUV radiation source in accordance with some embodiments of the present disclosure.

FIG. 6 shows a schematic view of a collector mirror and related portions of an EUV radiation source in accordance with some embodiments of the present disclosure. FIG. 6 shows a schematic view of the EUV radiation source 100 that includes a debris collection mechanism 150, the collector mirror 110 including the aperture 50, the droplet generator 115, and the droplet catcher 85. The circled area 152 in FIG. 6 shows drip holes 158. In some embodiments, the excess tin and molten debris that pass through the debris collection mechanism 150 are collected via drip holes 158. In some embodiments, the debris collection mechanism 150 is consistent with or includes the walls 146 of FIGS. 4A and 4B.

FIG. 7A shows devices for illuminating and imaging tin droplets and shock waves in an EUV radiation source in accordance with some embodiments of the present disclosure. A plan view 700 of FIG. 7A is a cut of the EUV radiation source 100 of FIG. 1. The plan view 700 includes a DIM 710A, a DDM 720A, the collector mirror 110, and the tin droplets DP moving from the droplet generator 115 to the zone of excitation ZE. The DIM 710A provides a light beam 740 to illuminate the droplets DP at the zone of excitation ZE and in a path between the droplet generator 115 and the zone of excitation ZE. In some embodiments, the DIM 710A includes one or more light sources, including one or more laser sources for illuminating the zone of excitation ZE and the path between the droplet generator 115 and zone of excitation ZE. In some embodiments, the DIM 710A includes collimating optics including one or more lenses for illuminating, e.g., uniformly illuminating, the zone of excitation ZE and the path between the droplet generator 115 and zone of excitation ZE. In some embodiments, the DDM 720A includes one or more image sensors, including a camera, e.g., a digital camera. In some embodiments, the DDM 720A includes condensing optics and/or imaging optics including one or more lenses for capturing the light reflected from the droplets DP and to generate one or more images of the droplets DP.

The plan view 700 also includes a shock wave illumination module (SWIM) 710D and a shock wave detection module (SWDM) 720D. In some embodiments, the SWIM 710D is used for illuminating a shock wave, e.g., shock wave 28 of FIG. 5A or 5B, that is generated around the zone of excitation ZE when the laser beam LR2 hits the droplet DP at the zone of excitation ZE. In some embodiments, the SWIM 710D includes collimating optics including one or more lenses for illuminating, e.g., uniformly illuminating, at and around the zone of excitation ZE. In some embodiments, the SWDM 720D includes one or more image sensors (image detectors), including a camera, e.g., a digital camera. In some embodiments, the SWDM 720D includes condensing optics and/or imaging optics including one or more lenses for capturing the light that passes through the shock wave 28 and to generate one or more images of the shock wave 28. Also, as shown in FIG. 7A, in addition to the SWDM 720D, at least one of the devices 720B or 720C is also installed around the EUV radiation source 100 such that the cameras of the devices 720B or 720C may take images of the shock wave 28 from multiple viewpoints inside the EUV radiation source 100 to determine a plane of the shock wave 28. Imaging the shock wave 28 is described in more detail with respect to FIGS. 8A, 8B, 9A, and 9B.

In some embodiments, a plurality of DIMs is installed around the EUV radiation source 100. As shown in FIG. 7A, in addition to the DIM 710A, devices 710B and 710C are also installed around the EUV radiation source 100 such that the light sources of devices 710B and 710C illuminate different views of the zone of excitation ZE and the path between the droplet generator 115 and the zone of excitation ZE. Also, as shown in FIG. 7A, in addition to the DDM 720A, at least one of the devices 720B or 720C is also installed around the EUV radiation source 100 such that the cameras of the devices 720B or 720C may take images of the droplets DP from multiple viewpoints inside the EUV radiation source 100.

In some embodiments, the camera of the DDM 720A takes at least two images of the zone of excitation ZE and/or the path between the droplet generator 115 and zone of excitation ZE. Therefore, the two or more images taken by the camera of the DDM 720A may show different locations of the droplets DP after being released from the droplet generator 115 and before reaching the zone of excitation ZE. In some embodiments, the two images are taken successively, with a slight time difference between them, and thus the images show how the droplets DP move from one image to the next image in the path between the droplet generator 115 and zone of excitation ZE. In some embodiments, a velocity and a location of the droplets DP is determined based on the successive images.

FIG. 7B shows devices for illuminating and imaging tin droplets in an EUV radiation source in accordance with some embodiments of the present disclosure. The device 790 shows the DIM 710, which is consistent with DIM 710A of FIG. 7A and the DDM 720, which is consistent with the DDM 720A of FIG. 7A. A light beam 740 of the DIM 710 illuminates the tin droplets DP in the EUV radiation source 100. The device 790 further captures images, via the DDM 720, of the tin droplets DP in the EUV radiation source 100.

In some embodiments, a light source of the DIM 710 is used for illuminating, by light beam 740, the zone of excitation ZE and the path between the droplet generator 115 and the zone of excitation ZE. The droplet DP ejected by from the nozzle 117 of the droplet generator 115 moves in a direction 712 between the droplet generator 115 and the zone of excitation ZE. The reflected or scattered light 722 from the one or more droplets DP is captured by an image sensor, e.g., a camera, in the DDM 720. In some embodiments and consistent with FIG. 7A, one or more other DIMs (not shown in FIG. 7B), having corresponding light sources, are included in the device 790 and the other DIMs are used to illuminate other parts and/or other views of the EUV radiation source 100. Also, consistent with FIG. 7A, one or more other DDMs (not shown) having corresponding image sensors, e.g., cameras, are included in the device 790 and the other cameras are used for capturing the reflected or scattered light from other views of the one or more droplets DP. The use of additional light beams 740 of the light sources of the other DIMs and using the cameras of the other DDMs allows images to be captured from multiple viewpoints inside the EUV radiation source 100. As noted above, the camera of DDM 720 and the cameras of the other DDMs, take two or more consecutive images, with a slight time difference between consecutive images. Thus, in some embodiments, a controller 750 of the device 790 is used for determining a location and velocity of the droplets DP. The velocity is determined by analyzing the captured consecutive images at one or more viewpoints and determining a distance the same droplet DP has travelled between the consecutive images.

In some embodiments, when the laser beam LR2, the excitation laser beam, hits the target droplet DP within the zone of excitation ZE, the plasma plume 23 forms because of ionization of the target droplet DP that causes the target droplet DP to expand rapidly into a plasma volume. The volume of the plasma plume 23 depends on the size of the target droplet DP and the energy provided by the laser beam LR2. In some embodiments, the plasma expands several hundred microns from the zone of excitation ZE and creates the shock wave 28. As used herein, the term "expansion volume" refers to a volume to which plasma plume 23 expands after the target droplets are heated with the excitation laser beam LR2.

In some embodiments, the DIM 710 includes a continuous wave laser. In other embodiments, the DIM 710 includes a pulsed laser. The wavelength of the laser of the DIM 710 is not particularly limited. In some embodiments, the laser of the DIM 710 has a wavelength in the visible region of electromagnetic spectrum. In some embodiments, the DIM 710 has a wavelength of about 1070 nm. In some embodiments, the laser of the DIM 710 has an average power in the range from about 1 W to about 50 W. For example, in some embodiments, the laser of the DIM 710 has an average power of about 1 W, about 5 W, about 10 W, about 25 W, about 40 W, about 50 W, or any average power between these values. In some embodiments, the DIM 710 generates a beam having a uniform illumination profile. For example, in some embodiments, the DIM 710 creates a fan-shaped light curtain or a thin plane of light having substantially the same intensity across its profile that illuminates the path between the droplet generator 115 and the zone of excitation ZE. In some embodiments, the DIM 710 creates a light beam with a substantially uniform intensity across a volume that illuminates the path between the droplet generator 115 and the zone of excitation ZE.

As the target droplet DP passes through the beam generated by the DIM 710, the target droplet DP reflects and/or scatters the photons in the beam. In an embodiment, the target droplet DP produces a substantially Gaussian intensity profile of scattered photons. The photons scattered by the target droplet DP are detected by the DDM 720. In some embodiments, the peak of the intensity profile detected by the DDM 720 corresponds to the center of the target droplet DP. In some embodiments, the DDM 720 includes a photodiode and generates two or more consecutive electrical signals upon detecting the photons reflected and/or scattered by the target droplet DP. In some embodiments, the DDM 720 includes a camera and generates two or more consecutive images of the photons reflected and/or scattered by the target droplet DP.

In an embodiment, a synchronizer 730 synchronizes the illumination light beam 740 generated by the DIM 710 with the recording of the illumination light reflected from or scattered by the particles to the DDM 720. In some embodiments, the controller 750 controls and synchronizes the synchronizer 730, the triggering of the DIM 710 and the DDM 720, and the releasing of tin droplets DP by the droplet generator 115. In addition, the controller 750 provides a trigger signal to the excitation laser source 300 of FIG. 1 that generates the laser beam LR2 such that a laser pulse generating the laser beam LR2 is synchronized with the releasing of tin droplets DP, the DIM 710, and the DDM 720. In some embodiments, the controller 750 controls the DIM 710 and DDM 720 through the synchronizer 730. In some embodiments, the synchronizer 730 does not exist and the controller 750 directly controls and synchronizes the DIM 710, the DDM 720, the excitation laser source 300, and the droplet generator 115. In some embodiments, a compression controller device 732 is attached to the nozzle 117 of the droplet generator 115. In some embodiments, the compression controller device 732 is made of piezoelectric material, such as a PZT, and by exerting a surface tension at one end of the nozzle 117 determines when a droplet DP is released. Thus, the controller 750 may be coupled to the compression controller device 732 and control when a droplet DP is released and also by modifying a voltage of the compression controller device 732 may change a speed of the droplet DP when released.

In some embodiments, the digital camera of DDM 720 uses CCD or CMOS image sensors and can capture two frames at high speed with a few hundred nano-seconds difference between the frames.

In some embodiments, lasers are used as the light source of DIM 710 due to their ability to produce high-power light beams with short pulse durations. This yields short exposure times for each frame. In some embodiments, Nd:YAG lasers are used. The Nd:YAG lasers emit primarily at about the 1064 nm wavelength and its harmonics (532, 266, etc.). For safety reasons, the laser emission is typically bandpass filtered to isolate the 532 nm harmonics (this is green light, the only harmonic able to be seen by the naked eye).

In some embodiments, the DIM 710 include optics for illuminating the path between the droplet generator 115 and the zone of excitation ZE. The optics include one or more spherical lenses and/or a cylindrical lens combination in some embodiments. The cylindrical lens expands the laser into a plane while the spherical lens compresses the plane into a thin sheet. A thickness of the plane is on the order of the wavelength of the laser light and occurs at a finite distance from the optics setup (the focal point of the spherical lens), in some embodiments. In some embodiments, the lens for the camera of DDM 720 is arranged to properly focus on and visualize the droplets in the path between the droplet generator 115 and the zone of excitation ZE.

In some embodiments, the synchronizer 730 acts as an external trigger for both the DDM 720 and the DIM 710. The controller 750 is arranged to control the synchronizer 730, DIM 710, and DDM 720. In some embodiments, the synchronizer 730 sets the timing of each frame of the DDM 720 sequence in conjunction with the firing of the illumination light source of DIM 710 to within 1 ns precision. Thus, the time between each pulse of the laser and the placement of the laser shot in reference to the camera's timing can be accurately controlled to determine the velocity of the droplets. Stand-alone electronic synchronizers, called digital delay generators, offer variable resolution timing from as low as 250 ps to as high as several milliseconds that can control the light source of DIM 710 and the detector (e.g., camera) of the DDM 720 and may provide multiple camera exposures.

FIG. 8A shows devices for illuminating and imaging the shock waves in the EUV radiation source in accordance with some embodiments of the present disclosure and FIG. 8B is a detailed view of the slit control mechanism used in the apparatus of FIG. 8A in accordance with an embodiment of the present disclosure.

In some embodiments, the device of FIG. 8A includes a SWIM 810, a SWDM 820, a controller 850 and a processor 800. In some embodiments, the SWIM 810 includes a radiation source 855, a tilt control mechanism 853, a slit control mechanism 857, and an illumination system 805. The tilt control mechanism 853 (also referred to herein as "auto tilt") controls the tilt of the radiation source 855, which is consistent with the EUV radiation source 100 of FIG. 1. In some embodiments, the auto tilt 853 is a stepper motor coupled to the radiation source 855 (e.g., a laser source) of the SWIM 810 and moves the radiation source 855 to change the angle of incidence at which light beam L (e.g., radiation) is incident at the plasma plume 23 and the shock wave 28 (and in effect changing the amount of light T passing through the plasma plume 23 and the shock wave 28 and into the SWDM 820). In some embodiments, the auto tilt 853 includes a piezoelectric actuator. In some embodiments, the illumination system 805 receives a light beam L0, e.g., a laser beam, from radiation source 855 and transforms the light beam L0 into light beam L, which is a collimated beam of light as shown in FIG. 9A.

The slit control mechanism 857 (also referred to herein as "auto slit") controls the amount of light that illuminates the zone of excitation ZE including the shock wave 28. In some embodiments, the illumination system 805 is placed between the radiation source 855 and the zone of excitation ZE. The slit control mechanism 857 of the SWIM 810 controls the amount of light which irradiates the plasma plume 23 and the shock wave 28. In some embodiments, the illumination system 805 includes a movable opaque barrier 854, as depicted in FIG. 8B, having several slits 854a, 854b, 854c or openings of different sizes and the slit control mechanism 857 determines which slit the light beam passes through. When, for example, the controller 850 determines, e.g., via a signal received from the SWDM 820, that the intensity of light detected at the SWDM 820 is lower than the acceptable range, the controller 850 commands the slit control mechanism 857 to move the slits such that a wider slit 854a is provided in the path of light in the illumination system 805, allowing more light to irradiate the zone of excitation ZE, and increasing the detected intensity. On the other hand, if it is determined that the intensity of light detected at the SWDM 820 is higher than the acceptable range, the controller 850 commands the slit control mechanism 857 to move the slits such that a narrower slit 854c is provided in the path of light in the illumination system 805, thereby reducing the detected intensity. In some embodiments, another parameter of the SWIM 810 adjusted by the controller 850 is the width of the slit in the opaque barrier 854 in the path of the light beam L exiting the illumination system 805.

While the auto tilt 853 and auto slit 857 are depicted in the FIG. 8A as being separate from the radiation source 855, in some embodiments, the auto tilt 853 and the auto slit 857 can be integrated with the radiation source 855 to form a single device of SWIM 810. In such embodiments, the coupling between the controller 850 and the SWIM 810 can be suitably modified to provide the same result as disclosed herein. The controller 850, thus, sets the intensity of light detected at the SWDM 820 to enable a stable detection of shock waves over a duration of time.

FIG. 9A shows an optical system for illuminating and imaging the shock waves in the EUV radiation source in accordance with some embodiments of the present disclosure. FIG. 9A includes an SWIM 910, consistent with the SWIM 810 of FIG. 8A that includes a light source 902, e.g., a point source, and a lens 904, and generates a light beam LL consistent with the light beam L of FIG. 8A. FIG. 9A also includes an SWDM 920, consistent with the SWDM 820 of FIG. 8A that includes a first lens 912, an aperture 914, a second lens 916, and a detector 918. The SWDM 920 receives a light beam TT, consistent with the light beam T of FIG. 8A, and generates an image at the detector 918. In some embodiments, as shown in FIG. 9A, the light beam LL is a collimating light beam that enters the zone of excitation ZE and the light beam TT transmits out of the zone of excitation ZE. In some embodiments, the zone of excitation ZE includes one or more of the elements of plasma plume 23, the pancake-shaped tin 27, and the shock wave 28. In some embodiments, the entering light beam LL interacts with the shock wave 28 at a point 924 of the shock wave 28 and generates the light rays 926 and 928 that are part of the light beam TT that is transmitted out of the zone of excitation ZE. In some embodiments, the optical system of FIG. 9A is a Schlieren photography system.

FIG. 9B shows the aperture 914 of the optical system of FIG. 9A for imaging the shock waves in the EUV radiation source in accordance with some embodiments of the present disclosure. The aperture 914 is shown in more detail in FIG. 9B and includes two barriers 934 and 932 for limiting an opening of the aperture 914. In some embodiments, the barriers 934 and 932 makes the opening asymmetrical such that the light ray 926 passes through the aperture 914 and the light ray 928 is blocked by the aperture 914. In some embodiments, the asymmetrical aperture 914 increases the contrast of the show wave imaged on the detector 918. In some embodiments, the aperture 914 is designed to increase the contrast. In some embodiments, the detector 918 is a camera, e.g., a digital camera.

Figure 10:
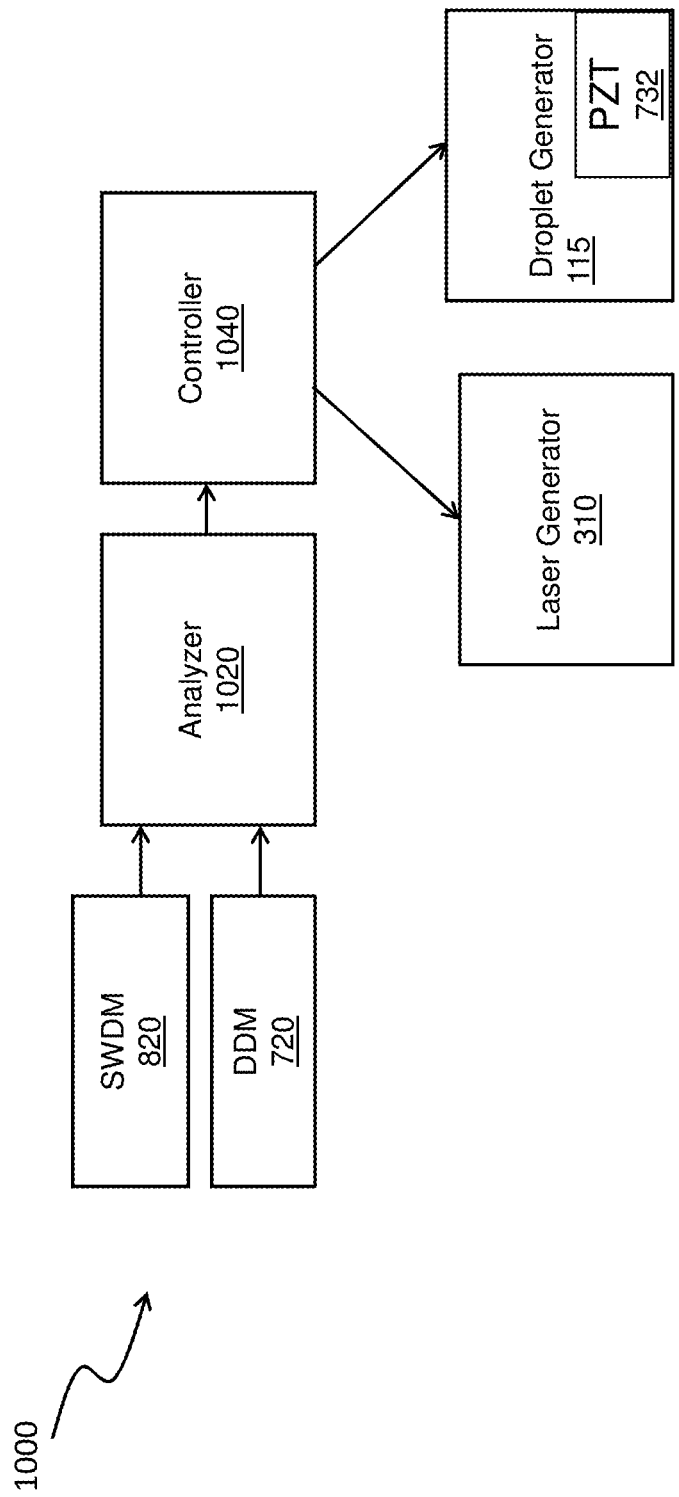
FIG. 10 shows a system for measuring a strength and direction of a shock wave, measuring a velocity and direction of droplets, and controlling an EUV radiation source, in accordance with some embodiments of the present disclosure.

FIG. 10 shows a system 1000 for measuring a strength and direction of a shock wave, measuring a velocity and direction of droplets, and controlling an EUV radiation source, in accordance with some embodiments of the present disclosure. The system 1000 includes a controller 1040 that is consistent with the controller 850 of FIG. 8. The system 1000 also includes an analyzer 1020. In some embodiments, the analyzer 1020 is implemented by one or more of the processor 800 of FIG. 8A, the controller 850 of FIG. 8A, and the controller 750 of FIG. 7B. As shown in FIG. 10, the analyzer 1020 is in communication with the SWDM 920 of FIG. 9A and/or the SWDM 820 of FIG. 8A and receives an image of the zone of excitation from the detector 918 of FIG. 9A. Also, the analyzer 1020 is in communication with the DDM 720 of FIG. 7B and receives an image of the path between the droplet generator 115 and the zone of excitation ZE from a detector, e.g., a camera, of the DDM 720. In some embodiments, the analyzer 1020 also receives two or more consecutive images of the photons reflected and/or scattered by the droplets DP in the path between the droplet generator 115 and the zone of excitation ZE.

In some embodiments, the analyzer 1020 determines a shock wave, e.g., the shock wave 28, in the zone of excitation ZE and also determines a plane of the shock wave 28, a magnitude of the shock wave 28, and velocity (speed and direction) of expansion of the shock wave 28. In some embodiments, the analyzer 1020 also determines locations and velocities of the droplets DP in the in the path between the droplet generator 115 and the zone of excitation ZE. In some embodiments, the analyzer 1020 determines that the shock wave 28 expands in a direction to impact the next droplets DP and alter the direction of the next droplets DP. In some embodiments, the analyzer 1020 determines that the impact of the shock wave 28 and the altering of the direction of the next droplets DP causes the next laser beam LR2 to miss the next droplet DP that the pulsed laser fires. In some embodiments, the consecutive images of the shock wave 28 are captured by SWDM 820 or SWDM 920 and the analyzer 1020 determines the velocity of expansion of the shock wave 28 based on the captured images.

In some embodiments, based on determining the laser beam LR2 will miss one of the next droplets DP, the analyzer 1020 sends a droplet-miss signal 1050 to the controller 1040. Upon receiving the droplet-miss signal from the analyzer 1020, the controller 1040 sends one or more commands to the laser generator 310 and/or the droplet generator 115. In some embodiments, the controller 1040 commands the droplet generator 115 to apply a first delay in the release of the next droplet DP and/or to modify, e.g., reduce, the speed of the next droplet DP when released. In some embodiments, the controller 1040 commands the laser generator 310 to apply a second delay in firing the next pulse of the laser beams LR2 and/or LR1. In some embodiments, when the analyzer 1020 determines that the shock wave 28 has cleared the path between the droplet generator 115 and the zone of excitation ZE, the analyzer 1020 clears the droplet-miss signal 1050 and in response the controller 1040 commands the laser generator 310 and the droplet generator 115 to apply no delay. In some embodiments, the first and the second delay is determined by either of the analyzer 1020 or controller 1040 such that the path between the droplet generator 115 and the zone of excitation ZE is clear of the shock wave 28 when the next droplet DP reaches each point of the path between the droplet generator 115 and the zone of excitation ZE. As noted, in response to the command to the droplet generator 115, the droplet generator 115 may apply the first delay to when the voltage is applied to the compression controller device 732 of the droplet generator 115 to release the next droplet DP. Also, in response to the command to the droplet generator 115, the droplet generator 115 may modify the voltage that is applied to the compression controller device 732 to modify the speed of the next droplet DP when released. In some embodiments, the analyzer 1020 and the controller 1040 are combined into one device such that the controller 1040 includes the analyzer 1020.

Figure 11:
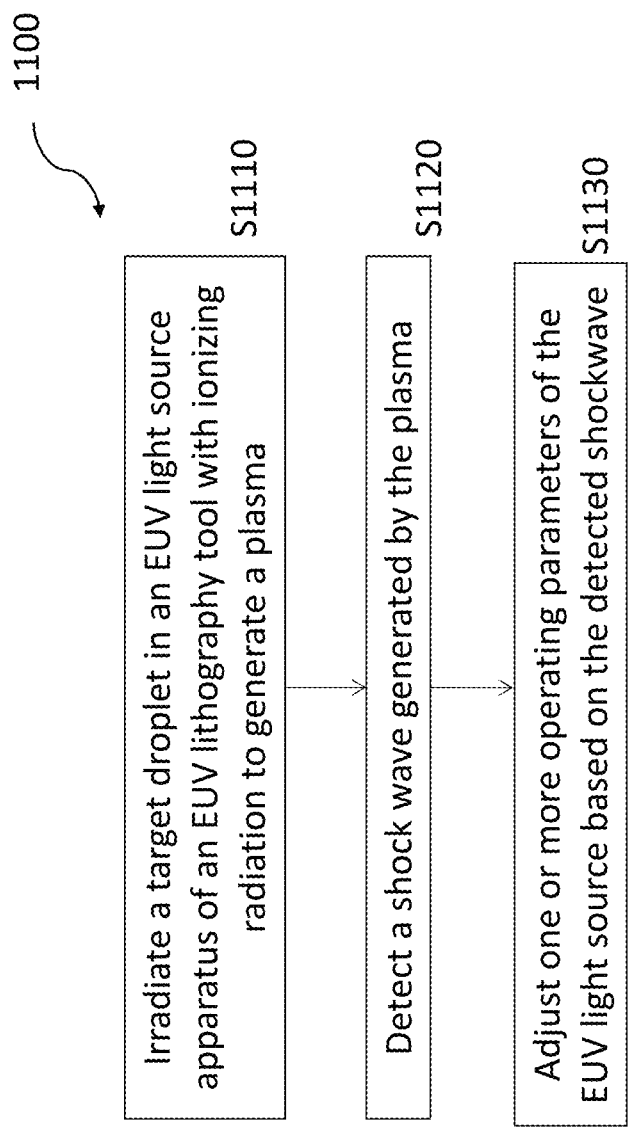
FIG. 11 illustrates a flow diagram of an exemplary process for detecting a shock wave in a EUV radiation source, in accordance with some embodiments of the present disclosure.

FIG. 11 illustrates a flow diagram 1100 of an exemplary process for detecting a shock wave in a EUV radiation source, in accordance with some embodiments of the present disclosure. In operation S1110, a target droplet, e.g., droplet DP of FIG. 1, is irradiated in an EUV radiation source 100 (light source) of an extreme ultraviolet lithography tool with ionizing radiation to generate a plasma. As shown in FIG. 1, a laser beam LR2 irradiates the droplet DP to generate a plasma, e.g., the plasma plume 23 shown in FIG. 2. A shock wave generated by the plasma is detected, in operation S1120. In some embodiments, the optical system of FIG. 9A is used for detecting the shock wave. In some embodiments, the detector 918, e.g., a camera, of FIG. 9A captures an image of the zone of excitation ZE and the analyzer 1020 of FIG. 10 detects a shock wave 28 in the captured image. Next, one or more operating parameters of the EUV light source 100 is adjusted based on the detected shock wave. In some examples, the detection of the shock wave changes the frequency of the generation of the droplets DP such that a shock wave generated by a target droplet may not affect the trajectory of the next droplet DP.

Figures 12A, 12B:
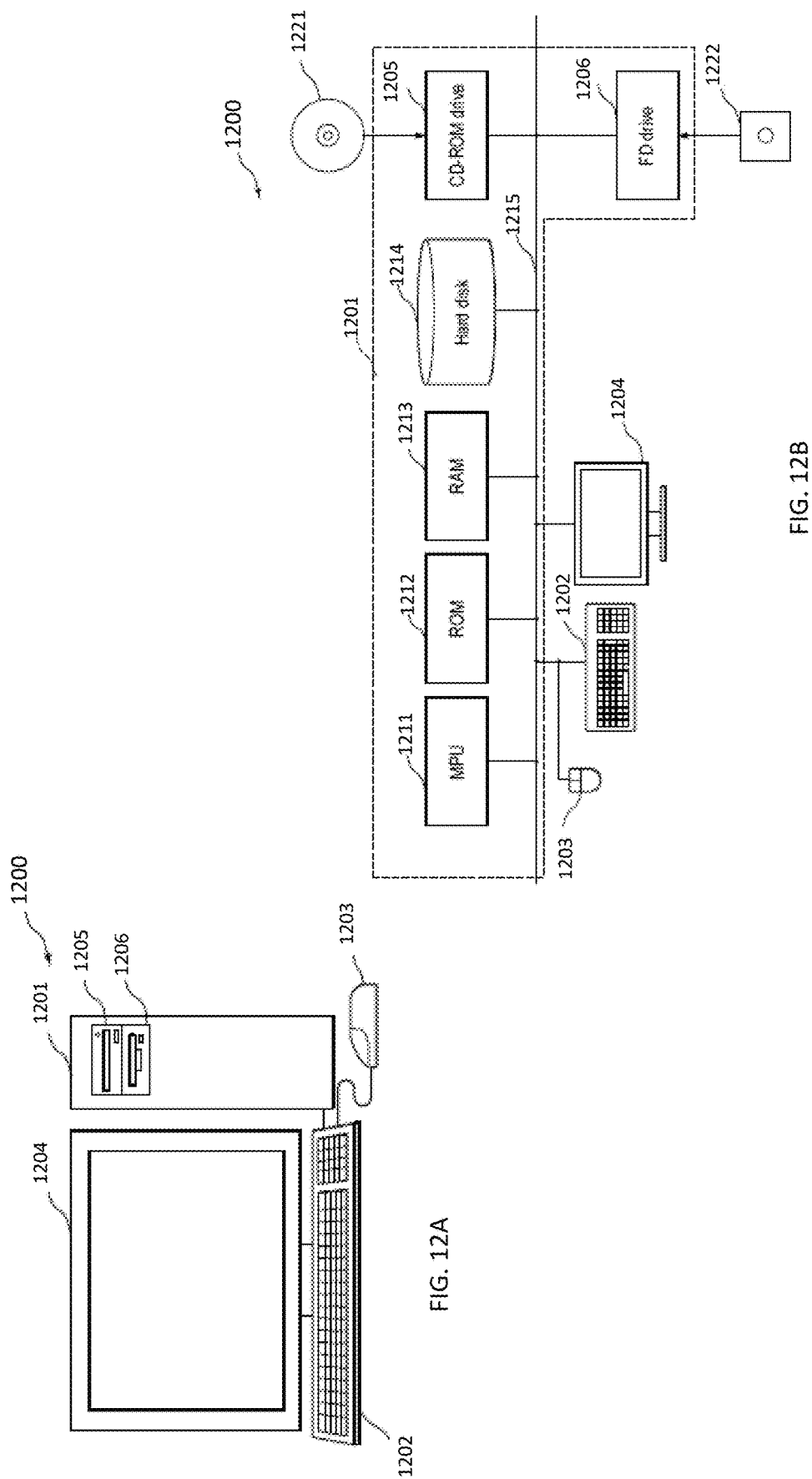
FIGS. 12A and 12B illustrate an apparatus for controlling and monitoring an EUV lithography system, in accordance with some embodiments of the present disclosure.

FIGS. 12A and 12B illustrate a computer system 1200 for controlling and monitoring an EUV lithography system, in accordance with some embodiments of the present disclosure. In some embodiments, the computer system 1200 is used for monitoring shock waves that are generated in the EUV lithography system and to control the EUV lithography system as described above such that the shock waves do not interfere with the droplets DP when the droplets DP travel between the droplet generator 115 and the zone of excitation ZE. Thus, in some embodiments, the computer system 1200 performs the functions of the controllers 750 and 850, the synchronizer 730, and the processor 800. FIG. 12A is a schematic view of a computer system that performs the monitoring of droplets and the shock waves in the EUV lithography system and controlling the parameters of the EUV lithography system that include the generation of droplets and the generation of the ionizing laser pulses. All of or a part of the processes, method and/or operations of the foregoing embodiments can be realized using computer hardware and computer programs executed thereon. The operations includes detecting the shock waves and determining the parameters of the shock waves. In FIG. 12A, the computer system 1200 is provided with a computer 1201 including an optical disk read only memory (e.g., CD-ROM or DVD-ROM) drive 1205 and a magnetic disk drive 1206, a keyboard 1202, a mouse 1203, and a monitor 1204.

FIG. 12B is a diagram showing an internal configuration of the computer system 1200. In FIG. 12B, the computer 1201 is provided with, in addition to the optical disk drive 1205 and the magnetic disk drive 1206, one or more processors, such as a micro processing unit (MPU), a ROM 1212 in which a program such as a boot up program is stored, a random access memory (RAM) 1213 that is connected to the MPU 1211 and in which a command of an application program is temporarily stored and a temporary storage area is provided, a hard disk 1214 in which an application program, a system program, and data are stored, and a bus 1215 that connects the MPU 1211, the ROM 1212, and the like. Note that the computer 1201 may include a network card (not shown) for providing a connection to a LAN.

The program for causing the computer system 1200 to execute the functions of an apparatus for performing the monitoring of the droplets DP and monitoring shock waves in the foregoing embodiments may be stored in an optical disk 1221 or a magnetic disk 1222, which are inserted into the optical disk drive 1205 or the magnetic disk drive 1206, and transmitted to the hard disk 1214. Alternatively, the program may be transmitted via a network (not shown) to the computer 1201 and stored in the hard disk 1214. At the time of execution, the program is loaded into the RAM 1213. The program may be loaded from the optical disk 1221 or the magnetic disk 1222, or directly from a network. The program does not necessarily have to include, for example, an operating system (OS) or a third party program to cause the computer 1201 to execute the functions of the photo mask data generating and merging apparatus in the foregoing embodiments. The program may only include a command portion to call an appropriate function (module) in a controlled mode and obtain desired results.

In some embodiments and returning back to FIG. 7B or 8A, the DDM 720 or SWDM 820 includes a photodiode designed to detect light having a wavelength of the light from the DIM 710/SWIM 810. In some embodiments, the DDM 720/SWDM 820 further includes one or more filters for filtering certain frequencies of light. For example, in an embodiment, the DDM 720/SWDM 820 includes a filter for blocking deep ultraviolet (DUV) radiation. In another embodiment, the DDM 720/SWDM 820 includes a filter for blocking all frequencies other than that of the light from the DIM 710/SWIM 810.

Referring back to FIG. 7B, in some embodiments, the controller 750 is a logic circuit programmed to receive a signal from the DDM 720, and depending on the received signal transmit control signals to one or more components of the EUV radiation source 100 to automatically adjust one or more operating parameters of the EUV radiation source 100. Referring back to FIG. 8A, in some embodiments, the controller 850 is a logic circuit programmed to receive a signal from the SWDM 820, and depending on the received signal transmit control signals to one or more components of the EUV radiation source 100 to automatically adjust one or more operating parameters of the EUV radiation source 100. In some embodiments, the controller 750 and the controller 850 are combined into a same controller. In some embodiments, the controller 750 and the controller 850 are combined are combined into processor 800.

As discussed above, the momentum carried by the shock wave 28 may be transferred to the next droplet DP or the pancake-shaped tin 27 and cause a position deviation such that the next laser pulse may not efficiently hit the next droplet DP or the next pancake-shaped tin 27 and may even miss the next droplet DP or the next pancake-shaped tin 27. Not efficiently hitting and missing the next droplet DP or the next pancake-shaped tin 27 may generate more debris which may deposit on the reflective surface of the collector mirror 110, thereby contaminating the reflective surface of the collector mirror 110 and lowering the quality of the reflected EUV light rays. Therefore, by controlling the generation of the droplets DP and the laser pulses of the laser beam LR2, the effect of the shock wave 28 may be minimized, less debris may be deposited on the surface of the collector mirror 110, and the quality of the reflected EUV light rays are not deteriorated.

According to some embodiments of the present disclosure, a method includes irradiating a target droplet in an extreme ultraviolet (EUV) light source apparatus of an EUV lithography tool with ionizing radiation to generate EUV radiation and a plasma. The method also includes detecting a shock wave generated by the plasma and adjusting one or more operating parameters of the EUV light source apparatus based on the detected shock wave. In an embodiment, the method further includes irradiating the shock wave with a non-ionizing light from a shock wave illumination module and capturing one or more images of the shock wave by a shock wave detection module. In an embodiment, the method further includes capturing consecutive images of the shock wave, detecting shock wave parameters based on the captured images of the shock wave, and adjusting the one or more operating parameters of the EUV light source apparatus based on the shock wave parameters. In an embodiment, the shock wave parameters include a direction of expansion and a velocity of expansion of the shock wave. In an embodiment, the one or more operating parameters of the EUV light source apparatus include one or more parameters of a droplet generator and a source of the ionizing radiation. In an embodiment, the one or more operating parameters of the EUV light source apparatus include a first time delay between ionizing radiation pulses of the source of the ionizing radiation and a second time delay between droplets generated by the droplet generator. In an embodiment, by adjusting one or both of the first time delay and the second time delay, the shock wave associated with the target droplet avoids impacting a next droplet. In an embodiment, the method further includes irradiating, with a non-ionizing light from a droplet illumination module, a path between a droplet generator and a zone of excitation. The zone of excitation is where the target droplet is irradiated by the ionizing radiation. The method also includes detecting a light reflected and/or scattered by droplets in the path to capture one or more images of the path by a droplet detection module. In an embodiment, the method further includes capturing consecutive images of the path by the droplet detection module, determining droplet parameters of at least one droplet based on the captured images, and adjusting the one or more operating parameters of the EUV light source apparatus based on the droplet parameters. In an embodiment, a source of the ionizing radiation is a pulsed laser. In an embodiment, a source of the non-ionizing light of the droplet illumination module is a first laser and a source of the non-ionizing light of the shock wave illumination module is a second laser.

According to some embodiments of the present disclosure, a method includes irradiating a zone of excitation of an EUV light source. A target droplet interacts with an ionizing radiation at the zone of excitation and creates a plasma. The method includes determining whether a shock wave is generated by the plasma and adjusting one or more operating parameters of the EUV light source based on the determination. In an embodiment, the method further includes irradiating a path between a droplet generator and the zone of excitation and detecting a light reflected and/or scattered by droplets in the path to capture one or more images of the path by a droplet detection module. In an embodiment, the method further includes capturing consecutive images of the shock wave by a shock wave detection module, detecting shock wave parameters based on the captured images of the shock wave, and adjusting the one or more operating parameters of the EUV light source based on the shock wave parameters.

According to some embodiments of the present disclosure, an apparatus for monitoring shock waves in an extreme ultraviolet light source includes a shock wave illumination module including a radiation source to illuminate a zone of excitation. A target droplet interacts with an ionizing radiation at the zone of excitation to generate an extreme ultraviolet light and a plasma. The apparatus further includes a shock wave detection module to capture one or more images of the zone of excitation. The apparatus also includes a controller coupled to the shock wave illumination module and the shock wave detection module to determine whether a shock wave is generated based on the captured images of the zone of excitation, determine shock wave parameters of the shock wave, and adjust one or more operating parameters of the extreme ultraviolet light source based on the shock wave parameters. In an embodiment, the apparatus further includes a droplet illumination module including a radiation source to illuminate a path between a droplet generator and the zone of excitation and a droplet detection module to detect a light reflected and/or scattered by droplets in the path to capture one or more images of the path. The controller further determines droplet parameters of at least one droplet based on the captured images of the path and adjusts the one or more operating parameters of the extreme ultraviolet light source based on the droplet parameters. In an embodiment, the one or more operating parameters of the extreme ultraviolet light source includes a first time delay between ionizing radiation pulses of a source of the ionizing radiation and a second time delay between droplets generated by a droplet generator. In an embodiment, the radiation source of the shock wave illumination module and the radiation source of the droplet illumination module are non-ionizing. In an embodiment, the radiation source of the shock wave illumination module and the radiation source of the droplet illumination module are non-ionizing lasers, and at least one of the non-ionizing lasers have a wavelength of about 1064 nm. In an embodiment, the apparatus further includes a synchronizer to synchronize the droplet illumination module with the droplet detection module and also to synchronize the shock wave illumination module with the shock wave detection module.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    irradiating a first target droplet in an extreme ultraviolet (EUV) light source apparatus of an EUV lithography tool with a focused radiation beam to generate EUV radiation and a plasma;
    detecting a shock wave generated by the plasma of the first target droplet; and
    adjusting one or more operating parameters of the EUV light source apparatus based on the detected shock wave, wherein by the adjusting the one or more operating parameters, an impact of the shock wave associated with the first target droplet on a next droplet is minimized.

2. The method of claim 1, further comprising:
    irradiating the shock wave with a non-ionizing light from a radiation source of a shock wave illumination module; and
    capturing one or more images of the shock wave by an image sensor of a shock wave detection module.

3. The method of claim 2, further comprising:
    capturing consecutive images of the shock wave;
    detecting shock wave parameters based on the captured images of the shock wave; and
    adjusting the one or more operating parameters of the EUV light source apparatus based on the shock wave parameters.

4. The method of claim 1, wherein the one or more operating parameters of the EUV light source apparatus comprise one or more parameters of one or both of a droplet generator or a source of the focused radiation beam.

5. The method of claim 4, wherein the one or more operating parameters of the EUV light source apparatus comprise one or both of a first time delay between pulses generated by the source of the focused radiation beam or a second time delay between droplets generated by the droplet generator.

6. The method of claim 5, wherein by adjusting one or both of the first time delay and the second time delay, the impact of the shock wave associated with the first target droplet on the next droplet is avoided.

7. The method of claim 2, further comprising:
    irradiating, with a non-ionizing light from a radiation source of a droplet illumination module, a path between a droplet generator and a zone of excitation, wherein the zone of excitation is where the first target droplet is irradiated by the focused radiation beam; and
    detecting a light reflected and/or scattered by droplets in the path to capture one or more images of the path by an image sensor of a droplet detection module.

8. The method of claim 7, further comprising
    capturing consecutive images of the path by the droplet detection module;
    determining droplet parameters of at least one droplet based on the captured images; and
    adjusting the one or more operating parameters of the EUV light source apparatus based on the droplet parameters.

9. A method, comprising:
    irradiating a zone of excitation of an EUV light source, wherein a first target droplet is configured to interact with a focused radiation beam at the zone of excitation and create a plasma;

determining whether a shock wave is generated by the plasma; and after determining the shock wave is generated, adjusting one or more operating parameters of the EUV light source, wherein by the adjusting the one or more operating parameters, an impact of the shock wave associated with the first target droplet on a next droplet is avoided.

10. The method of claim 9, further comprising:
irradiating a path between a droplet generator and the zone of excitation; and
detecting a light reflected and/or scattered by droplets in the path to capture one or more images of the path by an image sensor of a droplet detection module.

11. The method of claim 10, further comprising:
capturing consecutive images of the shock wave by an image sensor of a shock wave detection module;
detecting shock wave parameters based on the captured images of the shock wave; and
adjusting the one or more operating parameters of the EUV light source based on the shock wave parameters.

12. The method of claim 9, wherein the one or more operating parameters of the EUV light source comprise one of a first time delay between pulses generated by a source of the focused radiation beam or a second time delay between droplets generated by a droplet generator.

13. The method of claim 9, wherein a source of the focused radiation beam is a pulsed laser.

14. The method of claim 11, wherein the shock wave parameters comprise a direction of expansion and a velocity of expansion of the shock wave.

15. An apparatus for monitoring shock waves in an extreme ultraviolet light source, comprising:
a shock wave illumination module comprising a radiation source configured to illuminate a zone of excitation, wherein a first target droplet interacts with a focused radiation beam at the zone of excitation to generate an extreme ultraviolet light and a plasma;
a shock wave detection module comprising one or more image sensors and configured to capture one or more images of the zone of excitation; and
a controller coupled to the shock wave illumination module and the shock wave detection module and configured to:
determine whether a shock wave is generated based on the captured images of the zone of excitation;
determine shock wave parameters of the shock wave; and
adjust one or more operating parameters of the extreme ultraviolet light source based on the shock wave parameters, wherein the one or more operating parameters are adjusted such that an impact of the shock wave associated with the first target droplet on a next droplet is avoided.

16. The apparatus of claim 15, further comprising:
a droplet illumination module comprising a radiation source configured to illuminate a path between a droplet generator and the zone of excitation; and
a droplet detection module configured to detect a light reflected and/or scattered by droplets in the path to capture one or more images of the path;
wherein the controller is further configured to:
determine droplet parameters of at least one droplet based on the captured images of the path; and
adjust the one or more operating parameters of the extreme ultraviolet light source based on the droplet parameters.

17. The apparatus of claim 15, wherein the one or more operating parameters of the extreme ultraviolet light source comprise both of a first time delay between pulses generated by a source of the focused radiation beam and a second time delay between droplets generated by a droplet generator.

18. The apparatus of claim 16, wherein the radiation source of the shock wave illumination module and the radiation source of the droplet illumination module are non-ionizing.

19. The apparatus of claim 16, wherein the radiation source of the shock wave illumination module and the radiation source of the droplet illumination module are non-ionizing lasers, and at least one of the non-ionizing lasers have a wavelength of about 1064 nm.

20. The apparatus of claim 16, further comprising a synchronizer that is configured to synchronize the droplet illumination module with the droplet detection module and also synchronize the shock wave illumination module with the shock wave detection module.

* * * * *